United States Patent
Noguchi

(10) Patent No.: US 9,473,558 B2
(45) Date of Patent: *Oct. 18, 2016

(54) UTILIZATION OF TARGET BROWSERS

(71) Applicant: International Business Machines Corporation, Armonk, NY (US)

(72) Inventor: Atsushi Noguchi, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/096,833

(22) Filed: Apr. 12, 2016

(65) Prior Publication Data

US 2016/0226948 A1  Aug. 4, 2016

Related U.S. Application Data

(63) Continuation of application No. 14/147,643, filed on Jan. 6, 2014, now Pat. No. 9,350,790, which is a continuation of application No. 12/983,346, filed on Jan. 3, 2011, now abandoned.

(30) Foreign Application Priority Data

Feb. 4, 2010 (JP) .................................. 2010-023425

(51) Int. Cl.
*H04L 29/08* (2006.01)
*G06F 3/0484* (2013.01)
*G06F 3/0482* (2013.01)
(Continued)

(52) U.S. Cl.
CPC ............ *H04L 67/02* (2013.01); *G06F 3/0482* (2013.01); *G06F 3/04842* (2013.01); *G06F 3/1423* (2013.01); *G09G 5/12* (2013.01); *G09G 2310/04* (2013.01); *G09G 2370/02* (2013.01)

(58) Field of Classification Search
None
See application file for complete search history.

(56) References Cited

U.S. PATENT DOCUMENTS

| 5,774,670 A | 6/1998 | Montulli |
| 5,944,781 A | 8/1999 | Murray et al. |
| 5,944,791 A | 8/1999 | Scherpbier |

(Continued)

FOREIGN PATENT DOCUMENTS

| JP | 5089217 | 4/1993 |
| JP | 07-049936 A | 2/1995 |

(Continued)

OTHER PUBLICATIONS

Final Office Action (Mail Date Nov. 28, 2012) for U.S. Appl. No. 12/694,424, filed Jan. 27, 2010, First Named Inventor Atsushi Noguchi, Confirmation No. 5995.

(Continued)

*Primary Examiner* — Andrew Nalven
*Assistant Examiner* — Christopher Ruprecht
(74) *Attorney, Agent, or Firm* — Schmeiser, Olsen & Watts, LLP; John Pivnichny

(57) ABSTRACT

A method and system for utilizing target browsers. A client program is executed, which includes: (i) receiving a selection of at least one target browser by a user at a user interface at a first terminal, wherein the user interface displays two or more target browsers for each group of target browsers of two or more groups of target browsers from which the user has selected the at least one target browser; (ii) generating a message that includes the selected at least one target browser; and (iii) sending the message to a server.

18 Claims, 15 Drawing Sheets

(51) Int. Cl.
*G06F 3/14* (2006.01)
*G09G 5/12* (2006.01)

(56) References Cited

U.S. PATENT DOCUMENTS

| | | | |
|---|---|---|---|
| 6,014,702 A | 1/2000 | King et al. | |
| 6,085,224 A | 7/2000 | Wagner et al. | |
| 6,230,171 B1 | 5/2001 | Pacifici et al. | |
| 6,240,444 B1 | 5/2001 | Fin et al. | |
| 6,405,367 B1 | 6/2002 | Bryant et al. | |
| 6,571,389 B1 | 5/2003 | Spyker et al. | |
| 6,925,608 B1 | 8/2005 | Neale et al. | |
| 6,950,852 B1 | 9/2005 | Kobayaghi et al. | |
| 6,976,059 B1 | 12/2005 | Rogalski et al. | |
| 7,035,926 B1* | 4/2006 | Cohen | G06F 17/3089 707/E17.116 |
| 7,225,225 B2* | 5/2007 | Kuki | G06F 17/30873 707/E17.111 |
| 7,243,356 B1 | 7/2007 | Saulpaugh et al. | |
| 8,010,901 B1* | 8/2011 | Rogers | G06F 9/54 709/204 |
| 8,560,637 B2* | 10/2013 | Tsukada | H04L 67/08 707/607 |
| 2001/0037365 A1* | 11/2001 | Montague | G06F 17/30873 709/204 |
| 2002/0078177 A1 | 6/2002 | Dutta | |
| 2002/0089536 A1 | 7/2002 | Dang | |
| 2002/0107999 A1 | 8/2002 | Zimmermann et al. | |
| 2002/0138624 A1 | 9/2002 | Esenther | |
| 2002/0143859 A1 | 10/2002 | Kuki et al. | |
| 2003/0041109 A1 | 2/2003 | Meloni et al. | |
| 2003/0105819 A1 | 6/2003 | Kim et al. | |
| 2003/0146933 A1 | 8/2003 | Ullman et al. | |
| 2004/0158843 A1 | 8/2004 | Cloccarelli et al. | |
| 2005/0033656 A1 | 2/2005 | Wang et al. | |
| 2005/0055448 A1 | 3/2005 | Kim | |
| 2005/0108299 A1 | 5/2005 | Nakajima | |
| 2005/0108330 A1 | 5/2005 | Sakaguchi | |
| 2005/0198162 A1 | 9/2005 | Bauer et al. | |
| 2005/0219665 A1 | 10/2005 | Mino | |
| 2006/0129642 A1 | 6/2006 | Qian et al. | |
| 2006/0224967 A1* | 10/2006 | Marmaros | G06F 17/30884 715/738 |
| 2006/0259553 A1 | 11/2006 | Kawakita | |
| 2007/0143398 A1* | 6/2007 | Graham | G06Q 40/02 709/204 |
| 2007/0192456 A1* | 8/2007 | Tsukada | H04L 67/08 709/223 |
| 2007/0198713 A1* | 8/2007 | Tsao | H04L 41/22 709/225 |
| 2008/0066016 A1* | 3/2008 | Dowdy | G06F 17/30775 715/854 |
| 2008/0091761 A1* | 4/2008 | Tsao | G06F 9/526 709/201 |
| 2009/0037890 A1 | 2/2009 | Kazmi | |
| 2009/0164581 A1 | 6/2009 | Bove et al. | |
| 2009/0249216 A1* | 10/2009 | Charka | G06F 11/3688 715/744 |
| 2010/0005142 A1 | 1/2010 | Xiao et al. | |
| 2010/0192071 A1 | 7/2010 | Noguchi | |
| 2010/0306642 A1 | 12/2010 | Lowet et al. | |
| 2013/0086138 A1 | 4/2013 | Noguchi | |
| 2014/0122581 A1 | 5/2014 | Noguchi | |

FOREIGN PATENT DOCUMENTS

| | | |
|---|---|---|
| JP | H0749936 | 2/1995 |
| JP | 09-114788 A | 5/1997 |
| JP | H02114788 | 5/1997 |
| JP | 10124461 | 5/1998 |
| JP | 2000112862 A | 4/2000 |
| JP | 2000-137683 A | 5/2000 |
| JP | 2000137683 | 5/2000 |
| JP | 2000194661 | 7/2000 |
| JP | 2001282561 | 10/2001 |
| JP | 2002-063124 A | 2/2002 |
| JP | 2002063124 | 2/2002 |
| JP | 2002-328886 A | 11/2002 |
| JP | 2002328886 | 11/2002 |
| JP | 2003150440 A | 5/2003 |
| JP | 2004213280 A | 7/2004 |
| JP | 2005-018499 A | 1/2005 |
| JP | 2005018499 | 1/2005 |
| JP | 2005285107 | 10/2005 |
| JP | 2006202228 A | 8/2006 |
| JP | 2007-034687 A | 2/2007 |
| JP | 2007034687 | 2/2007 |
| JP | 2007-079988 A | 3/2007 |
| JP | 2007079988 | 3/2007 |
| JP | 2007-293885 A | 11/2007 |
| JP | 2007293885 | 11/2007 |
| JP | 2009053957 A | 3/2009 |
| JP | 2010-092103 A | 4/2010 |
| JP | 2010-097543 A | 4/2010 |
| JP | 2010092103 | 4/2010 |
| JP | 2010097543 | 4/2010 |
| JP | 2011048605 | 3/2011 |

OTHER PUBLICATIONS

Unbeatable JavaScript Tools—The Dojo Toolkit. [online]. 1 page. [retrieved on Nov. 19, 2010]. Retrieved from the Internet: < URL: http://dojotoolkit.org/ >.

Office Action (Mail Date Oct. 25, 2013) for U.S. Appl. No. 12/694,424, filed Jan. 27, 2010, First Named Inventor Atsushi Noguchi, Confirmation No. 5995.

JPO Office Action dated Jul. 2013, 2 pages.

Office Action (Mail Date Dec. 17, 2012) for U.S. Appl. No. 12/983,346, filed Jan. 3, 2011, Application No. JP920090101US1, Confirmation No. 1178.

Office Action Response filed Mar. 18, 2013 for U.S. Appl. No. 12/983,346, filed Jan. 3, 2011, Application No. JP920090101US1, Confirmation No. 1178.

Final Office Action (Mail Date Jul. 3, 2013) for U.S. Appl. No. 12/983,346, filed Jan. 3, 2011, Application No. JP920090101US1, Confirmation No. 1178.

Final Office Action Response filed Jun. 29, 2013 for U.S. Appl. No. 12/983,346, filed Jan. 3, 2011, Application No. JP920090101US1, Confirmation No. 1178.

Notice of Allowance (Mail Date Oct. 9, 2013) for U.S. Appl. No. 12/983,346, filed Jan. 3, 2011, Application No. JP920090101US1, Confirmation No. 1178.

Sue et al.; WebSphere Application Server: Feature Pack for Web 2.0; Web Messaging; SWG WebSphere, Apr. 2008; Web 2.0 Feature Pack for WAs WorkShop, IBM, 2008, 40 pages. English Translation (Abstract Only); 2 pages; URL:http://download.boulder.ibm.com/ibmdl/pub/software/dw/jp/websphere/was/vas_web20fep_ws/FPWEB20_06WebMessaging.pdf; May 21, 2008.

Notice of Allowance (Mail Date Jan. 21, 2014) for U.S. Appl. No. 12/983,346, filed Jan. 3, 2011, Application No. JP920090101US1, Confirmation No. 1178.

RCE (filed Dec. 5, 2013) for U.S. Appl. No. 12/983,346, filed Jan. 3, 2011, Application No. JP920090101US1, Confirmation No. 1178.

Anonymous; Method of Synchronizing Multiple Applets; IP.com PriorArtDatabase Technical Disclosure; IPCOM000206786D; May 9, 2011.

Wikipedia; Sorting algorithm [online]; Jun. 7, 2012 {retrieved on Jun. 12, 2012]; Retrieved from the Internet: <URL: http://en.wikipedia.org/wiki/Sorting_algorithm; 8 pages.

Wikipedia; Divide and conquer algorithm [online]; May 20, 2012 [retrieved on Jun. 12, 2012], Retrieved from the Internet: <URL: http://en.wikipedia.org/wiki/Divide_and_conquer_algorithm; 5 pages.

Patent Application for U.S. Appl. No. 13/567,182, filed Aug. 6, 2012, Confirmation No. 1076.

Office Action (Mail Date Mar. 13, 2012) for U.S. Appl. No. 12/694,424, filed Jan. 27, 2010, Confirmation No. 5995.

Amendment (filed Jun. 8, 2012) for U.S. Appl. No. 12/694,424, filed Jan. 27, 2010, Confirmation No. 5995.

(56) References Cited

OTHER PUBLICATIONS

Date of JPO Office Action Mar. 18, 2014, IDS, 2 pages.
Office Action (Feb. 13, 2015) for U.S. Appl. No. 13/567,182, filed Aug. 6, 2012, Conf. No. 1076.
Amendment (May 13, 2015) for U.S. Appl. No. 13/567,182, filed Aug. 6, 2012, Conf. No. 1076.
Date of JPO Office Action Apr. 21, 2015, IDS, 3 pages.
Office Action (Sep. 21, 2015) for U.S. Appl. No. 14/147,643, filed Jan. 6, 2014, Conf. No. 7950.
Amendment (Dec. 21, 2015) for U.S. Appl. No. 14/147,643, filed Jan. 6, 2014, Conf. No. 7950.
Notice of Allowance (Mar. 3, 2016) for U.S. Appl. No. 14/147,643, filed Jan. 6, 2014, Conf. No. 7950.

* cited by examiner

UTILIZATION OF TARGET BROWSERS

This application is a continuation application claiming priority to Ser. No. 14/147,643, filed Jan. 6, 2014, which is a continuation of Ser. No. 12/983,346, filed Jan. 3, 2011, abandoned.

FIELD OF THE INVENTION

The present invention relates to a method and system for updating display screens.

BACKGROUND OF THE INVENTION

There has been known a method for synchronously operating multiple web browsers. In addition, a function to notify a web browser in real time of an event having occurred in a server has been known. It is often the case that a user operates multiple web browsers concurrently. Such a case requires the user to do burdensome operations of switching the multiple web browsers in turn. Thus there is a need to utilize multiple web browsers more efficiently.

SUMMARY OF THE INVENTION

The present invention provides a method for updating display screens, said method performed in a system comprising a first terminal and at least one terminal, said method comprising:

a first web browser in the first terminal receiving from a server a web page that includes a client program, said server coupled to the first terminal and to each terminal of the at least one terminal, said at least one terminal not including the first terminal;

a first processor in the first terminal executing the client program via execution of the client program by a first client-program executing unit in the first terminal, said first client-program executing unit being external to and coupled to a first web browser in the first terminal, said executing the client program triggered by the first web browser and comprising:

said first processor receiving a selection of at least one target browser by a user at the first terminal, said first processor detecting an event resulting from the user's operation on a first display screen at the first terminal, in response to said detecting the event, said first processor generating a message comprising the selected at least one target browser, a description of the event, and a parameter pertaining to the event, and said first processor in the first terminal sending the message to the server;

each terminal of the at least one terminal receiving the message from the server, each terminal of the at least one terminal comprising at least one web browser to which at least one respective client-program executing unit and at least one respective display screen is coupled, said receiving the message from the server being performed by a processor in each terminal of at the least one terminal via execution of the respective client-program executing unit;

in response to each processor in each terminal receiving the message from the server, each processor in no less than one terminal of the at least one terminal ascertaining, via execution of the respective client-program executing unit, that the at least one target browser in the message comprises the web browser to which the respective client-program executing unit is coupled in each terminal of the no less than one terminal; and in response to said ascertaining, each processor in the no less than one terminal triggering, via execution of the of the respective client-program executing unit, an updating of the respective display screen in accordance with the description of the event and the parameter pertaining to the event in the message.

The present invention provides a terminal and at the least one terminal comprises a processor, a memory coupled to the processor, and a computer readable storage device coupled to the processor and containing program code configured to be executed by the processor via the memory to implement a method, said method comprising:

method for updating display screens, said method performed in a system comprising a first terminal and at least one terminal, said method comprising:

a first web browser in the first terminal receiving from a server a web page that includes a client program, said server coupled to the first terminal and to each terminal of the at least one terminal, said at least one terminal not including the first terminal;

a first processor in the first terminal executing the client program via execution of the client program by a first client-program executing unit in the first terminal, said first client-program executing unit being external to and coupled to a first web browser in the first terminal, said executing the client program triggered by the first web browser and comprising:

said first processor receiving a selection of at least one target browser by a user at the first terminal, said first processor detecting an event resulting from the user's operation on a first display screen at the first terminal, in response to said detecting the event, said first processor generating a message comprising the selected at least one target browser, a description of the event, and a parameter pertaining to the event, and said first processor in the first terminal sending the message to the server;

each terminal of the at least one terminal receiving the message from the server, each terminal of the at least one terminal comprising at least one web browser to which at least one respective client-program executing unit and at least one respective display screen is coupled, said receiving the message from the server being performed by a processor in each terminal of at the least one terminal via execution of the respective client-program executing unit;

in response to each processor in each terminal receiving the message from the server, each processor in no less than one terminal of the at least one terminal ascertaining, via execution of the respective client-program executing unit, that the at least one target browser in the message comprises the web browser to which the respective client-program executing unit is coupled in each terminal of the no less than one terminal; and in response to said ascertaining, each processor in the no less than one terminal triggering, via execution of the of the respective client-program executing unit, an updating of the respective display screen in accordance with the description of the event and the parameter pertaining to the event in the message.

DETAILED DESCRIPTION OF THE INVENTION

A first aspect of the present invention provides a client program downloaded and executed corresponding to each of a plurality of web browsers on at least one terminal to update respective display screens of the plurality of web browsers, the client program causing the terminal executing the program to function as: a selection unit that selects at least one operation target browser from among the plurality of web browsers; an event sending unit that sends a server apparatus an event and browser identification information specifying the operation target browser, the event having occurred on its own browser that is the web browser corresponding to the client program; an event receiving unit that receives an event having occurred on any of the plurality of web browsers from the server apparatus; and a screen updating unit that updates a display screen of the own browser to obtain a screen according to the received event. Also provided are a terminal which executes the above-described client program, a server apparatus, a system, and a method.

Figure 1:
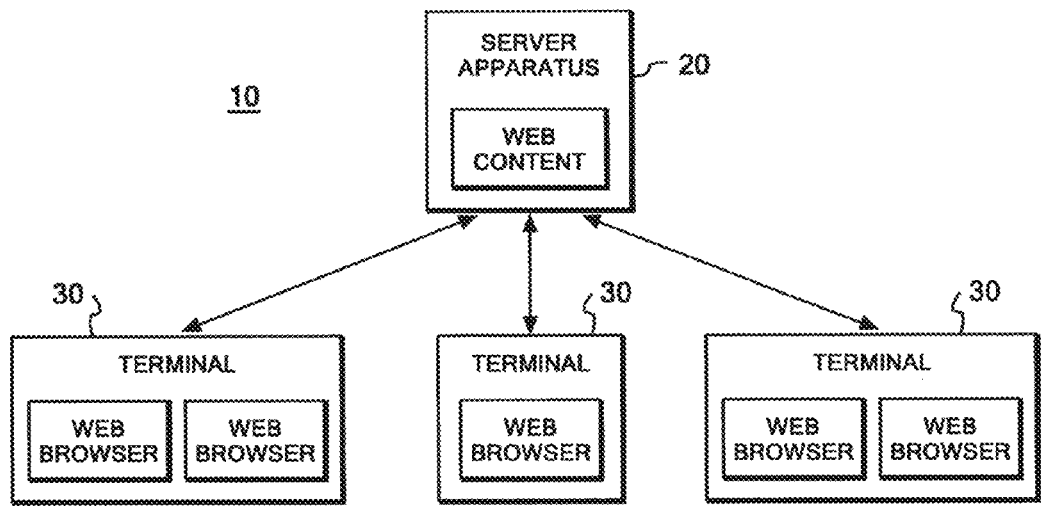
FIG. 1 shows a configuration of a computer system, in accordance with embodiments of the present invention.

FIG. 1 shows a configuration of a computer system 10, in accordance with embodiments of the present invention. The computer system 10 includes a server apparatus 20 and at least one terminal 30. The server apparatus 20 provides a web content to each of multiple web browsers running on the at least one terminal 30. As an example, the server apparatus 20 provides a web page which is a HyperTexr Markup Language (HTML) file to each of the multiple web browsers as the web content.

Each terminal of the at least one terminal 30 is connected to the server apparatus 20 via a network. Each terminal of the at least one terminal 30 executes a web browser. Each terminal of the terminals 30 may execute one web browser or may execute multiple web browsers in parallel.

In accordance with an operation by a user, each web browser of the multiple web browsers obtains a web content from the server apparatus 20, executes the web content, and displays information provided by the web content. Each web browser of the multiple web browsers downloads a web page, for example, and displays the web page on a display screen.

Figure 2:
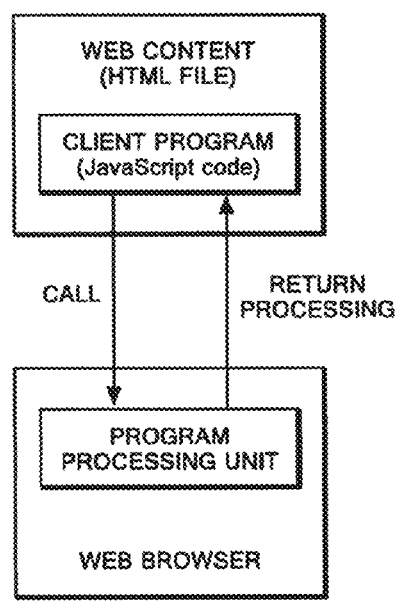
FIG. 2 shows a configuration of a web content and a web browser, in accordance with embodiments of the present invention.

FIG. 2 shows a configuration of a web content and a web browser, in accordance with embodiments of the present invention. The web content includes a client program. The client program is a program written in a code executable by the web browser, such as JavaScript®. The client program is inserted in a web page which is a HTML file, for example. In addition, the client program is created by a provider of the web content, for example.

The client program according to one embodiment is downloaded and executed for each of multiple web browsers on the at least one terminal 30. Then, the client program downloaded and executed for one web browser of the multiple web browsers can make respective display screens of the other web browsers updated. The web browser in FIG. 2 comprises a program processing unit which is represented as a browser executing unit 60 in FIG. 3.

Figure 3:
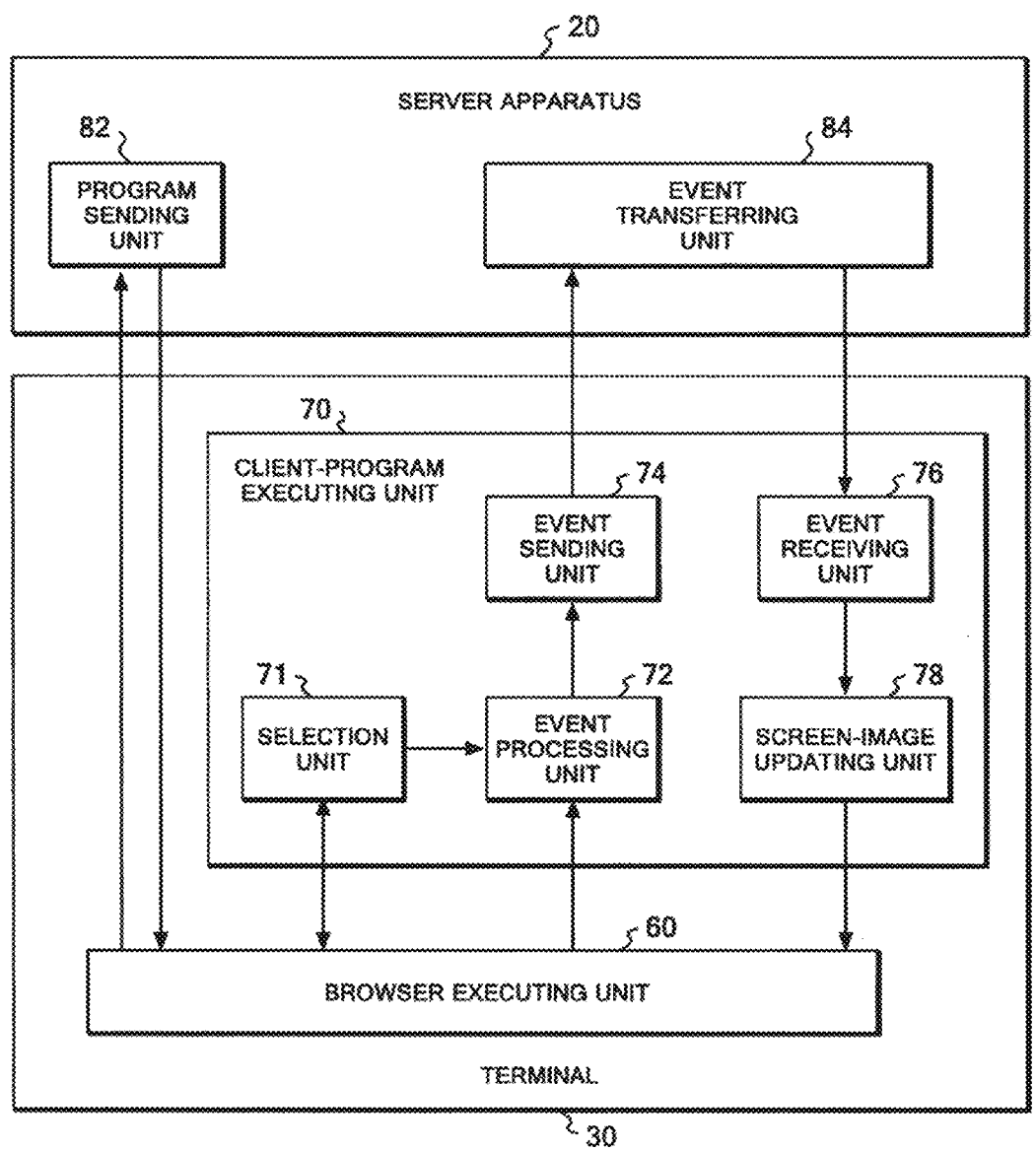
FIG. 3 shows a functional configuration of a server apparatus and a terminal, in accordance with embodiments of the present invention.

FIG. 3 shows a functional configuration of the server apparatus 20 and one of the terminals 30, in accordance with embodiments of the present invention. For each web browser 30, the terminal 30 includes a browser executing unit 60 and a client-program executing unit 70 and a display screen. Each web browser in each terminal 30 comprises a respective browser executing unit 60 and accesses a respective display screen.

The browser executing unit 60 is implemented through execution of a web browser by the terminal 30. The browser executing unit 60 of the web browser obtains a web content from the server apparatus 20, and displays information provided by the web content, on a display screen for the web browser. Furthermore, the browser executing unit 60 causes the client program executing unit 70 in the terminal 30 to execute a client program included in the web content obtained by the browser executing unit 60.

The client-program executing unit 70 is implemented through execution of the client program by the terminal 30. The client-program executing unit 70 is implemented for each of multiple web browsers running on the at least one terminal 30.

The client-program executing unit 70 includes a selection unit 71, an event processing unit 72, an event sending unit 74, an event receiving unit 76, and a screen-image updating unit 78. The selection unit 71 selects at least one operation target browser from among the multiple web browsers running on the at least one terminal 30.

The selection unit 71 selects at least one operation target browser in response to a user's instruction, for example. At this time, the selection unit 71 may select multiple operation target browsers. In addition, as an operation target browser, the selection unit 71 may select its own web browser, which is a web browser corresponding to the client program.

The event processing unit 72 obtains an event having occurred in response to a user's operation on a display screen of its own browser. The event processing unit 72 obtains, as an event corresponding to the user's operation on its own browser, a button operation, a key operation, a character input operation, or a pointer movement operation, for example.

Moreover, the event processing unit 72 creates a message, for example, notifying of the occurrence of the obtained event. The event processing unit 72 includes, in the message, a content and a parameter of the obtained event, for example. When an event of a character input operation occurs for example, the event processing unit 72 includes, in the message, the character code of the inputted characters as a parameter. Instead, when an event of a pointer movement operation occurs for example, the event processing unit 72 includes, in the message, the coordinates of the pointer as a parameter.

Furthermore, the event processing unit 72 includes in the message, browser ID information for use in identifying the operation target browser selected by the selection unit 71. If the selection unit 71 selects multiple operation target browsers, the event processing unit 72 includes in the message multiple pieces of browser ID information.

The event sending unit 74 sends an event having occurred on its own browser, together with the browser ID information, to the server apparatus 20. For example, the event sending unit 74 sends the server apparatus 20 a message which is created by the event processing unit 72 and which includes the event and the browser ID information.

The event receiving unit 76 receives from the server apparatus 20 the event having occurred on multiple web browsers running on the at least one terminal 30, together with the browser ID information. Specifically, the event receiving unit 76 receives from the server apparatus 20 an event having occurred on its own browser or on browsers other than its own browser, together with the browser ID information. The event receiving unit 76 receives the message including the event and the browser ID information, for example.

Once the event receiving unit 76 receives the event from the server apparatus 20, the screen-image updating unit 78 checks whether or not the browser ID information received together with the event indicates its own browser. If the received browser ID information indicates its own browser, the screen-image updating unit 78 updates the display screen of its own browser to obtain a screen according to the event received through the server apparatus 20. For example, the screen-image updating unit 78 provides the browser executing unit 60 with the content and the parameter of the event included in the message received by the event receiving unit 76, and causes the browser executing unit 60 to update the display screen of its own browser to obtain a screen according to the content and the parameter of the event.

Alternatively, if the received browser ID information does not indicate its own browser, the screen-image updating unit 78 executes no processing. In a case, for example, where the received browser ID information does not indicate its own browser, the screen-image updating unit 78 neither provides the browser executing unit 60 with any data, nor causes the browser executing unit 60 to update the display screen of its own browser.

In this manner, the screen-image updating unit 78 can update the display screen of its own browser in accordance with the event having occurred on its own browser or on the other web browsers. For example, the browser executing unit 60 can display character strings inputted in the other web browsers on the display screen of its own browser. Additionally, for example, the browser executing unit 60 can update the position of the pointer on the display screen of its own browser in accordance with operations performed on the other web browsers.

The server apparatus 20 includes a program sending unit 82 and an event transferring unit 84. The program sending unit 82 sends a client program to the at least one terminal 30 in response to a request from any web browser of the multiple web browsers running on the at least one terminal 30. To be more specific, the program sending unit 82 sends a client program which causes the terminal 30 to function as the selection unit 71, the event processing unit 72, the event sending unit 74, the event receiving unit 76, and the screen-image updating unit 78.

The event transferring unit 84 receives the event and the browser ID information from one web browser of the multiple web browsers. For example, the event transferring unit 84 receives the event and the browser ID information which are included in a message.

Thereafter, the event transferring unit 84 transfers the received event to at least the operation target browser specified by the browser ID information to make the display screen of the operation target browser updated to obtain an updated screen according to the event. For example, the event transferring unit 84 transfers the message including the event and the browser ID information to at least the operation target browser specified by the browser ID information.

In this respect, the event transferring unit 84 transfers the received event and the browser ID information to all the multiple web browsers connected to the server apparatus 20, for example. Instead, the event transferring unit 84 may transfer the received event only to the operation target browser specified by the browser ID information, for example. The server apparatus 20 as described above can make the display screen of the at least one operation target browser updated, among the multiple web browsers on the at least one terminal 30.

Figure 4:
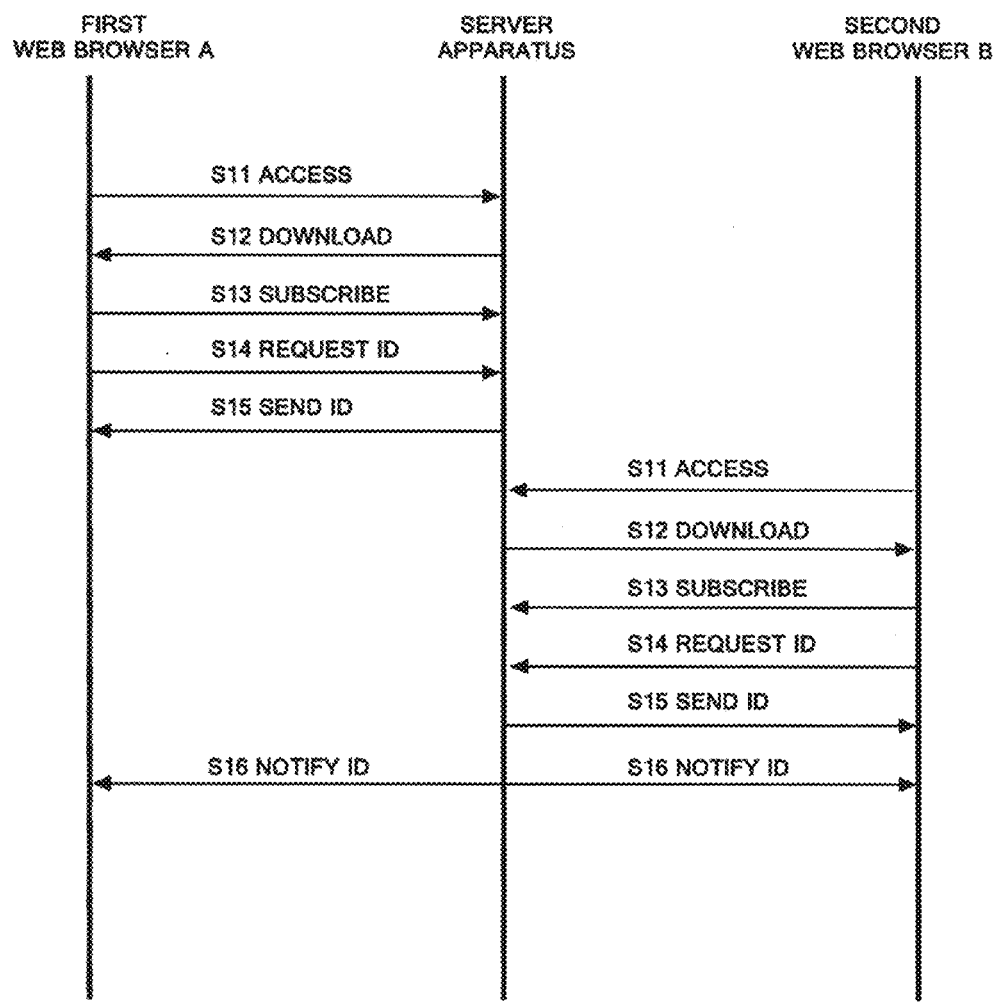
FIG. 4 shows an example of steps in a processing flow performed when a first web browser A and a second web browser B access a web page provided by a server apparatus, in accordance with embodiments of the present invention.

FIG. 4 shows an example of a processing flow performed when a first web browser A and a second web browser B access a web page provided by the server apparatus 20, in accordance with embodiments of the present invention. FIG. 5 to FIG. 8 show examples of information displayed on a display screen of a web browser in respective steps of the processing flow shown in FIG. 4, in accordance with embodiments of the present invention.

Firstly, the first web browser A accesses the server apparatus 20 (S11) and downloads a web page (S12). This web page includes a client program written by JavaScript® or the like, for example. Then, the first web browser A causes the terminal 30 to execute the client program included in the downloaded web page. This allows the terminal 30, which executes the first web browser A, to implement therein the client-program executing unit 70 corresponding to the first web browser A.

Figure 5:
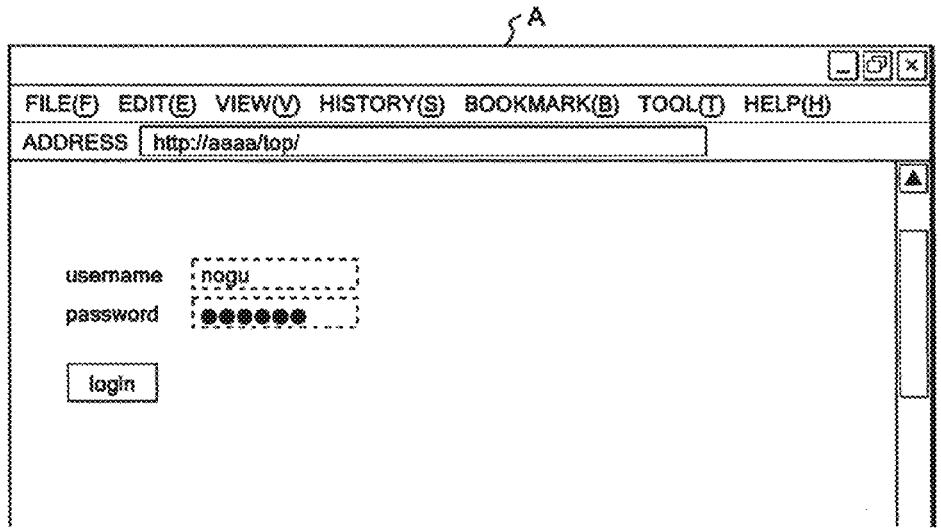
FIG. 5 shows an example of a display screen which is displayed on a web browser in a processing of step S11 of FIG. 4, in accordance with embodiments of the present invention.

Subsequently, the client-program executing unit 70 corresponding to the first web browser A subscribes to the server apparatus 20 (S13). For example, the client-program executing unit 70 requires inputs of a user name and a password into the display screen of the first web browser A as shown in FIG. 5.

The client-program executing unit 70 sends the inputted user name and the password to the server apparatus 20 and thus subscribes to a topic identified by the user name. For example, in the subscription, the client-program executing unit 70 registers a callback function in the server apparatus 20 in advance, to allow the server apparatus 20 to call the client-program executing unit 70 itself later.

Subsequently, the client-program executing unit 70 corresponding to the first web browser A requests the server apparatus 20 to send browser ID information (ID) for use in identifying the first web browser A (S14). The client-program executing unit 70 may request the browser ID information at the same time as the processing of Step S13.

Figure 6:
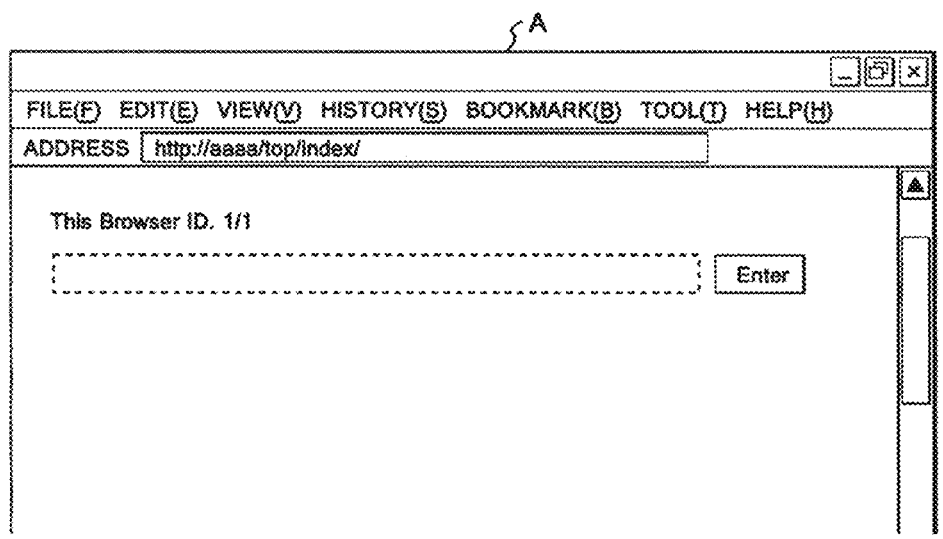
FIG. 6 shows an example of a display screen which is displayed on a first web browser A after processing step S15 of FIG. 4, in accordance with embodiments of the present invention.

Thereafter, the server apparatus 20 assigns the browser ID information to the first web browser A, the browser ID information being unique to the browser in a topic identified by the user name. Then, the server apparatus 20 sends the assigned browser ID information to the client-program executing unit 70 corresponding to the first web browser A (S15). The client-program executing unit 70 corresponding to the first web browser A stores therein the received browser ID information and displays the browser ID information on the display screen of the first web browser A in a manner as shown in FIG. 6, for example.

Subsequently, the second web browser B executes the processing of Steps S11 to S12 in the same manner as the first web browser A does. In this way, the terminal 30 which executes the second web browser B can implement therein the client-program executing unit 70 corresponding to the second web browser B.

Then, the client-program executing unit 70 corresponding to the second web browser B also executes the processing of Steps S13 to S15 in the same manner as the client-program executing unit 70 corresponding to the first web browser A does. In this way, the client-program executing unit 70 corresponding to the second web browser B subscribes to the same topic as the first web browser A does, and stores the browser ID information which is unique to the browser in the topic. Accordingly, the client-program executing unit 70 corresponding to the second web browser B can display the browser ID information on the display screen of the second web browser B.

In addition, when adding or deleting any web browser which subscribes to a given topic, the server apparatus 20 sends, to each of the client-program executing units 70 corresponding to all the web browsers subscribing to the given topic, browser ID information (ID) on all the web browsers which subscribe to the given topic after the addition or the deletion (S16). Each of the client-program executing units 70 corresponding to the multiple web browsers stores in its memory the received browser ID information on all the web browsers. In this manner, the client-program executing unit 70 can always keep the browser ID information updated, for all the web browsers subscribing to the same topic.

Meanwhile, the selection unit 71 included in the client-program executing unit 70 displays a user interface on the display screen of its own browser. Here, the user interface is used for selecting an operation target browser from among the multiple web browsers subscribing to the given topic. On the basis of the multiple pieces of browser ID information stored in the memory, for example, the selection unit 71 creates a user interface for use in selecting the operation target browser.

Figure 7:
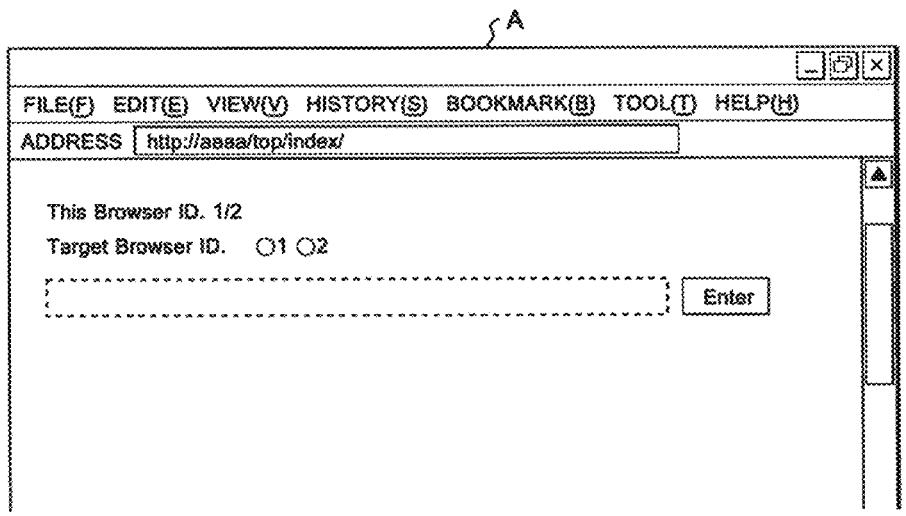
FIG. 7 shows an example of a display screen of the first web browser A which displays select buttons for use in selecting an operation target browser, in accordance with embodiments of the present invention.
Figure 8:
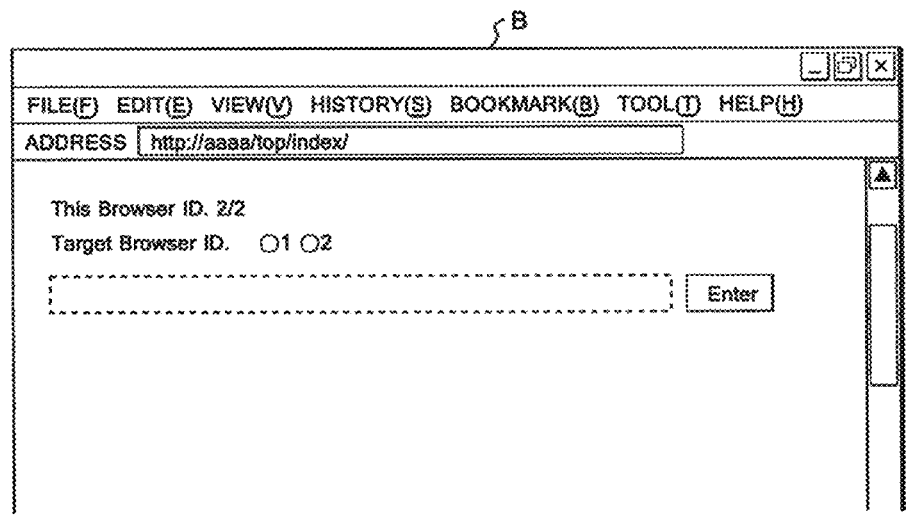
FIG. 8 shows an example of a display screen of a second web browser B which displays select buttons for use in selecting an operation target browser, in accordance with embodiments of the present invention.

FIG. 7 shows an example of the display screen of the first web browser A which displays select buttons for use in selecting an operation target browser. In addition, FIG. 8 shows an example of the display screen of the second web browser B which displays select buttons for use in selecting an operation target browser. The selection unit 71 displays selection buttons as shown in FIG. 7 and FIG. 8, for example, as a user interface for use in selecting the operation target browser.

Figure 9:
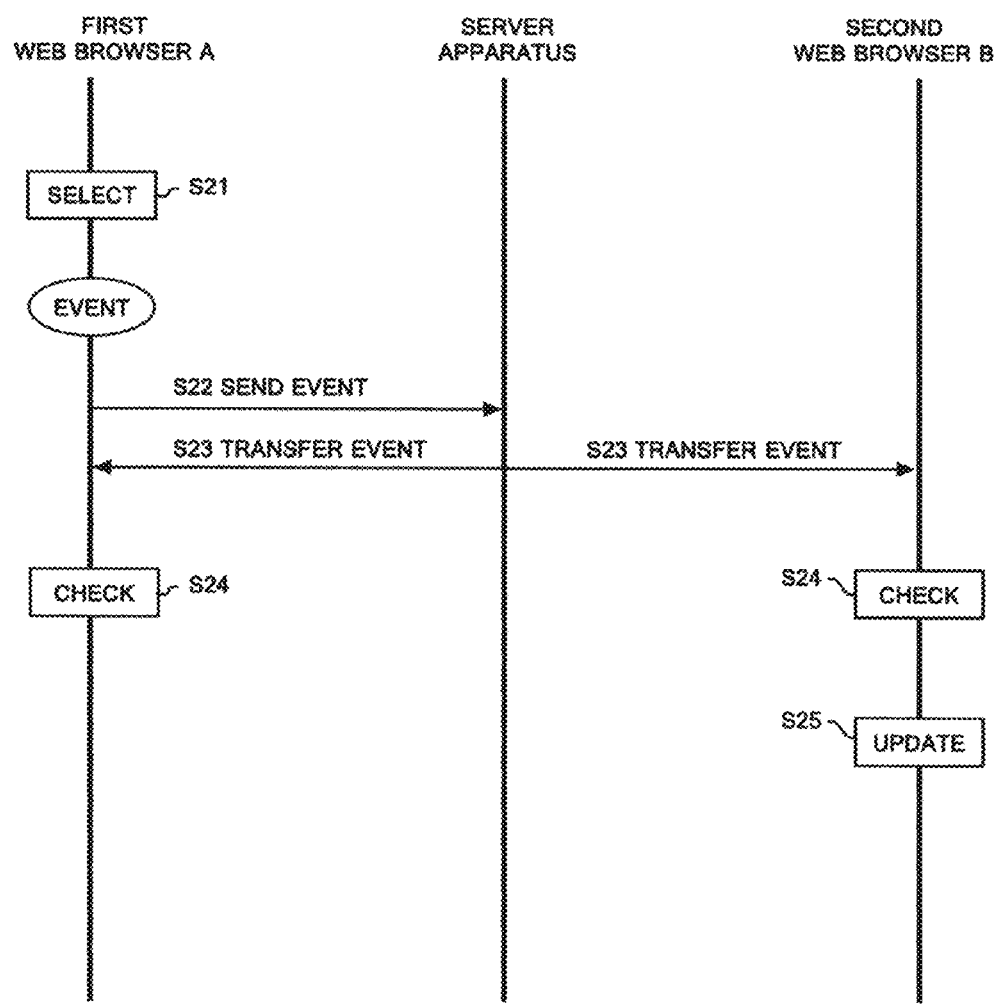
FIG. 9 shows a processing flow performed to update the second web browser B in accordance with an event having occurred on the first web browser A, in accordance with embodiments of the present invention.

FIG. 9 shows a processing flow performed to update the second web browser B in accordance with an event having occurred on the first web browser A, in accordance with embodiments of the present invention. FIG. 10 to FIG. 13 show examples of information displayed on a display screen of a web browser in steps of the processing flow shown in FIG. 9, in accordance with embodiments of the present invention.

Figure 10:
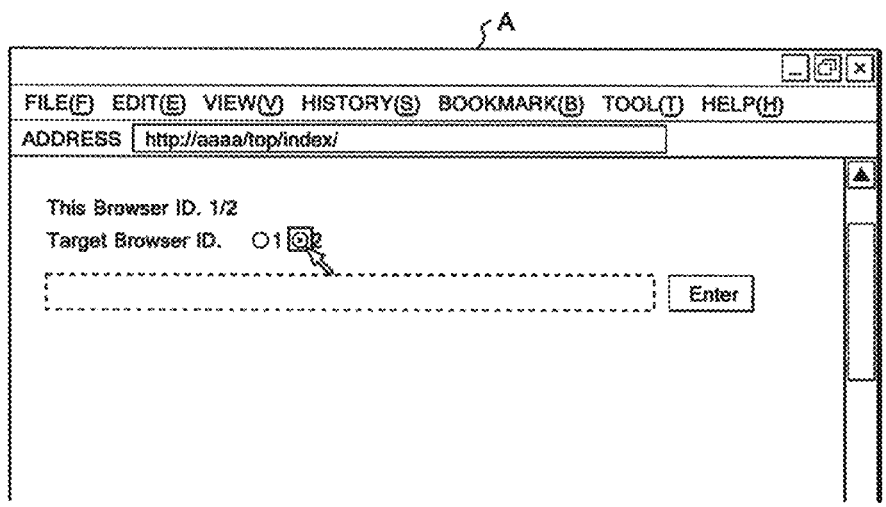
FIG. 10 shows an example of the display screen which is displayed on the first web browser A in a processing of step S21 of FIG. 9.

Firstly, in response to a user's operation, the selection unit 71 included in the client-program executing unit 70 corresponding to the first web browser A selects at least one operation target browser from among multiple web browsers subscribing to a given topic (S21). For example, as shown in FIG. 10, the selection unit 71 selects the second web browser B as the operation target browser in response to the user's selection of the second web browser B. In this respect, the selection unit 71 may select multiple operation target browsers concurrently, or may select its own browser as the operation target browser.

Figure 11:
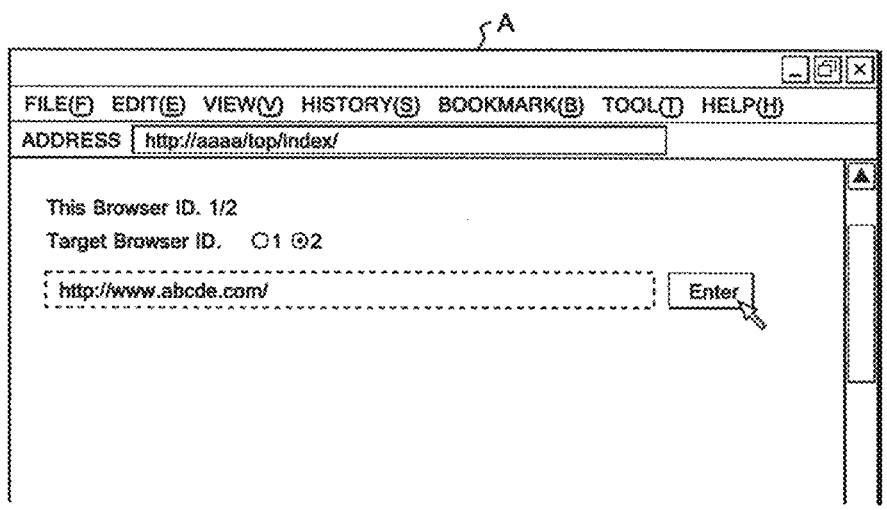
FIG. 11 shows an example of the display screen of the first web browser A when an event has occurred on the first web browser A, in accordance with embodiments of the present invention.

Thereafter, an event occurs on the display screen of the first web browser A. For example, as shown in FIG. 11, events occur on the display screen of the first web browser A, the events including: an event in which a character string (Uniform Resource Locator (URL), for example) is inputted in a box; and an event in which a button (Enter button) to display a web page specified by the inputted character string in the box is clicked.

Upon occurrence of the events on the display screen of the first web browser A, the event processing unit 72 included in the client-program executing unit 70 corresponding to the first web browser A is called subsequently. The event processing unit 72 obtains the content and the parameter of each of the events having occurred on the first web browser A.

Thereafter, the event processing unit 72 creates a message and then calls the event sending unit 74. The message includes the content and the parameter of each of the events as well as the browser ID information for use in identifying the operation target browser selected by the selection unit 71. Then, the event sending unit 74 sends the message which is created by the event processing unit 72 and which includes the events, to the event transferring unit 84 of the server apparatus 20 (S22).

After that, the event transferring unit 84 of the server apparatus 20 receives the message including the events. Upon receipt of the message including the events, the event transferring unit 84 transfers the received message including the events to each of the multiple web browsers subscribing to the given topic (S23). In this example, the event transferring unit 84 transfers the received message including the events to each of the client-program executing units 70 respectively corresponding to the first web browser A and the second web browser B. In this regard, the event transferring unit 84 may transfer the message including the events only to the web browser specified by the browser ID information included in the message.

Then, the event receiving unit 76 included in each of the client-program executing units 70 corresponding to the multiple web browsers receives the message including the events from the server apparatus 20. Upon receipt of the message including the events, the event receiving unit 76 calls the screen-image updating unit 78.

The screen-image updating unit 78 checks whether or not the browser ID information included in the message received by the event receiving unit 76 matches with the browser ID information on the own web browser (S24). In this example, the browser ID information in the message indicates the second web browser B. Thus, the screen-image updating unit 78 included in the client-program executing unit 70 corresponding to the first web browser A determines that the browser ID information included in the message does not match with the browser ID information on the first web browser A. On the other hand, the screen-image updating unit 78 included in the client-program executing unit 70 corresponding to the second web browser B determines that the browser ID information included in the message matches with the browser ID information on the second web browser B.

Figure 12:
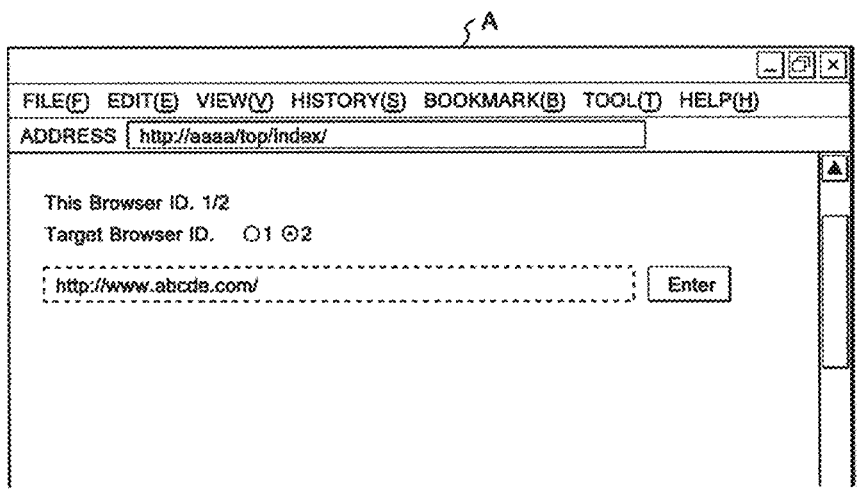
FIG. 12 shows an example of the display screen of the first web browser A after processing in accordance with the event is executed, in accordance with embodiments of the present invention.

In the case where the browser ID information included in the message does not match with the browser ID information on the own web browser, the screen-image updating unit 78 ends the processing without executing any further processing. Accordingly, in this example, the screen-image updating unit 78 included in the client-program executing unit 70 corresponding to the first web browser A does not execute any further processing. As such, as shown in FIG. 12, the first web browser A displays no new information on the display screen.

Meanwhile, in the case where the browser ID information included in the message matches with the browser ID information on the own web browser, the screen-image updating unit 78 updates the display screen of the corresponding web browser to obtain a screen according to the content and the parameter of each of the events included in the message transferred from the server apparatus 20 (S25). In this example, the screen-image updating unit 78 included in the client-program executing unit 70 corresponding to the second web browser B updates the display screen of the second web browser B in accordance with the content and the parameter of each of the events included in the message.

Figure 13:
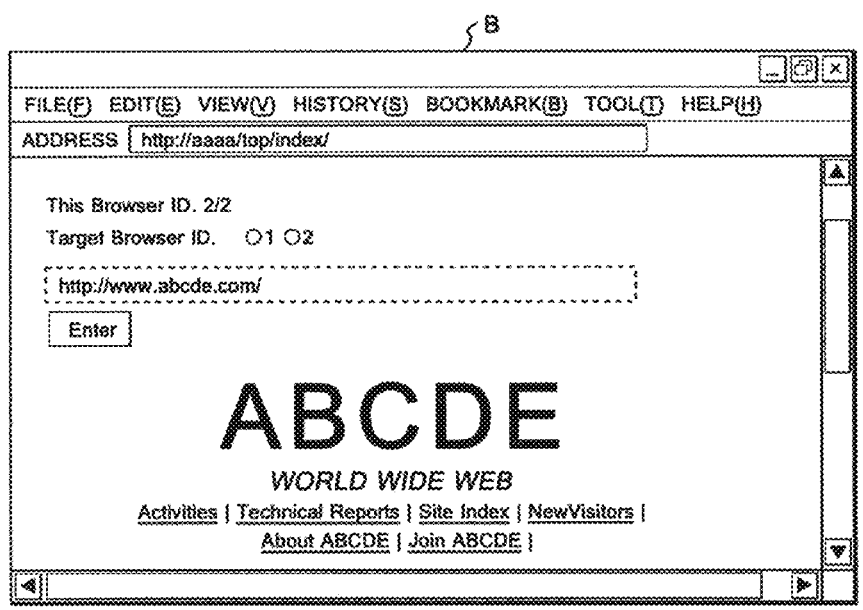
FIG. 13 shows an example of the display screen of the second web browser B after processing in accordance with the event is executed, in accordance with embodiments of the present invention.

Specifically, the screen-image updating unit 78 updates the display screen of the second web browser B in accordance with the event having occurred on the display screen of the first web browser A. Accordingly, as shown in FIG. 13, the second web browser B downloads a web page by use of the character string (URL) inputted in the box on the display screen of the first web browser A, and displays the downloaded web page.

In the subsequent processing, every time an event occurs on a display screen of any of the multiple web browsers, the client-program executing unit 70 corresponding to each of the web browsers executes processing of steps S22 to S25 as described above.

As has been described, according to the computer system 10, in response to occurrence of an event on a given web browser, display screens of the other web browsers can be updated. Therefore, in a case, for example, where a user operating multiple web browsers in parallel makes an operation on one of the web browsers, the computer system 10 of the embodiment enables updating display screens of the multiple web browsers.

Moreover, the computer system 10 transfers a message indicating the content and the parameter of an event having occurred on a given web browser, which successfully reduces the amount of information communicated as well as the time needed for updating the screen. Furthermore, the computer system 10 also reduces the user's burden, since there is no need for the user to install an exclusive application into the terminal 30 and instead, a client program is downloaded and executed by existing web browsers.

When selecting an operation target browser from among multiple web browsers, the selection unit 71 may select the web browser for itself (its own browser) as the operation target browser. This allows not only updating other web browsers, but also updating the own browser in synchronous with the other web browsers.

Upon receipt of a message including an event from a given web browser, the server apparatus 20 may transfer the received message not to all the multiple web browsers connected to the server apparatus 20 itself, but to only the web browser specified by the browser ID information included in the received message. This allows the server apparatus 20 to reduce the amount of data transfer and the amount of processing on the web browser.

In step S22, the event sending unit 74 may send the server apparatus 20 the browser ID information and own browser information for use in identifying its own browser, together with the event having occurred on its own browser. Meanwhile, the client-program executing unit 70 corresponding to the operation target browser having received the event may send back, to the web browser having sent the event, information on the result of updating the display screen by the screen-image updating unit 78 in accordance with the received event. For example, the client-program executing unit 70 sends codes as the information on the result of updating the display screen by the screen-image updating unit 78 in accordance with the received event. The codes include: a code indicating success or failure in updating the display screen; a code indicating the cause of the failure in the case where updating fails; and other codes.

Such a code allows the computer system 10 to notify the user operating a given web browser of the result as to whether updating display screens of the other web browsers through the operation of the given web browser ends in success or in failure. The computer system 10 eliminates the need for the user to directly check the displayed contents of the other web browsers, thereby achieving reduction in the user's burden.

Additionally, once predetermined processing (processing of updating a screen image by the screen-image updating unit 78, for example) is executed on a web browser, the event sending unit 74 may send the server apparatus 20 an event which is previously registered and is not accompanied by updating the display screen. For example, in the case where the screen-image updating unit 78 sends back, to the web browser which has sent the event, information on the result of updating the display screen, the event sending unit 74 sends the server apparatus 20 the event which is previously registered and is not accompanied by updating the display screen. In this manner, when a given web browser executes processing, the computer system 10 is capable of notifying other web browsers of the content of the executed processing, as similar to the case where the event having occurred by the user's operation is transferred to the other web browsers.

Figure 14:
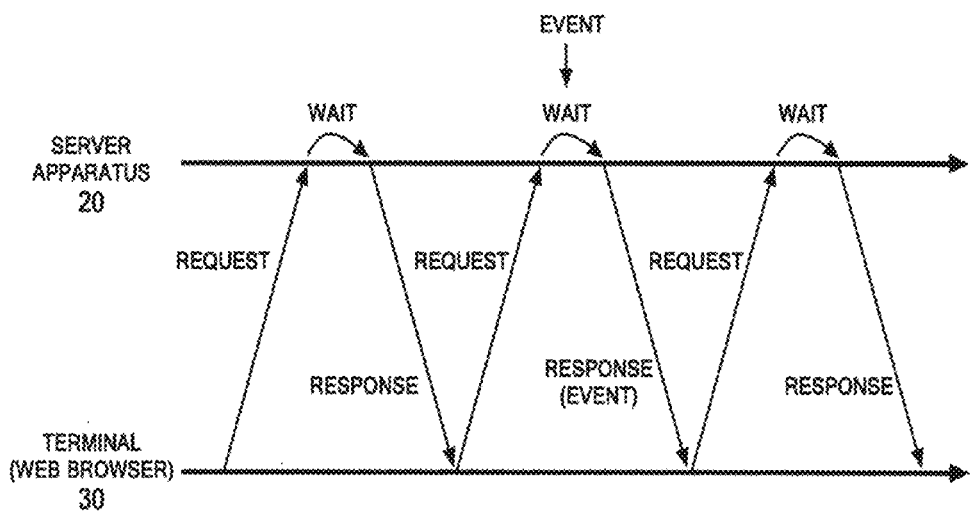
FIG. 14 shows an example of processing performed to send an event from the server apparatus to the terminal in accordance with embodiments of the present invention.

FIG. 14 shows an example of processing performed to send an event from the server apparatus 20 to the terminal 30, in accordance with embodiments of the present invention. The computer system 10 according to one embodiment causes the server apparatus 20 to send an event to the terminal 30 in a manner as shown in FIG. 14, for example.

Specifically, each of multiple web browsers repeatedly sends a request to the server apparatus 20, and receives a response from the server apparatus 20. In this case, each web browser of the multiple web browsers sends the next request to the server apparatus 20 immediately after the receipt of one response.

Upon receipt of a request from the web browser, the server apparatus 20 sends a response to the corresponding web browser after waiting for a predetermined time period or more. For example, the server apparatus 20 sends a response after waiting for about 60 seconds after the receipt of the request.

When the server apparatus 20 is to send a certain response, and receives a message including an event from a web browser during a period after transmission of the previous response but before the transmission of the certain response, the server apparatus 20 includes, in the certain response, the received message including the event. In this manner, upon receipt of a message including an event from any of multiple web browsers, the server apparatus 20 is capable of transferring the received message to each of the multiple web browsers without time lag.

Figure 15:
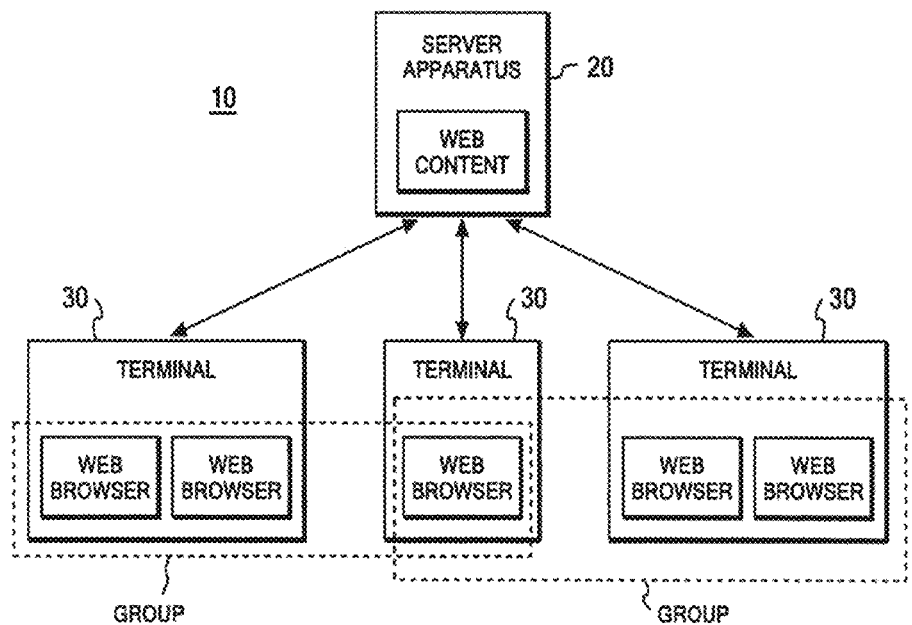
FIG. 15 shows a configuration of a computer system according to a first modified example of embodiments of the present invention.

FIG. 15 shows a configuration of a computer system 10 according to a first modified example of an embodiment of the present invention. The computer system 10 according to the modified example employs the configuration and the functions almost the same as those of the computer system 10 according to the embodiment shown in FIG. 1. Therefore, the same reference sign is given to a component which has the configuration and the functions almost the same as those of the component shown in FIG. 1, and the description are given only to different components.

The computer system 10 according to the first modified example includes multiple groups each including multiple web browsers. In response to occurrence of an event on a display screen of a given web browser in a group, the computer system 10 updates display screens of the other web browsers in the group.

In the modified example, when subscribing to a certain group, a web browser sends the server apparatus 20 the group name and the password of the certain group. This allows the server apparatus 20 to manage, on a group basis, multiple web browsers connected to the server apparatus 20 itself.

In addition, one web browser is allowed to subscribe to multiple groups concurrently. Thus, a web browser subscribing to both a first group and a second group, for example, can update display screens of other web browsers in the first group as well as display screens of other web browsers in the second group.

Figure 16:
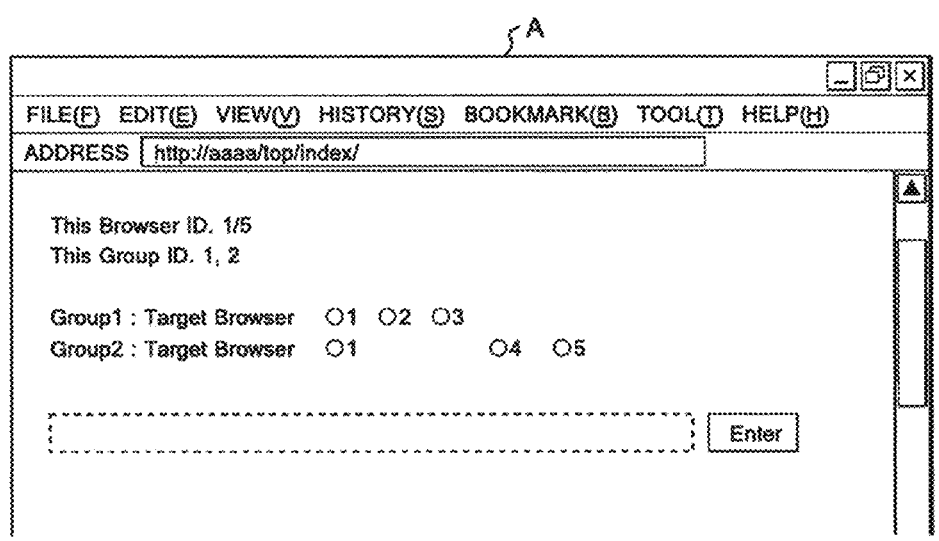
FIG. 16 shows an example of a display screen displayed on a web browser subscribing to multiple groups concurrently, in the first modified example of embodiments of the present invention.

FIG. 16 shows an example of a display screen displayed on a web browser subscribing to multiple groups concurrently, in the first modified example of an embodiment of the present invention. In a case where one web browser subscribes to multiple groups concurrently, the selection unit 71 displays, for each group, on the display screen of its own browser, a user interface (selection buttons, for example) for use in selecting an operation target browser.

For example, in a case where the web browser for itself (own browser) subscribes to the first group and the second group concurrently, as shown in FIG. 16, the selection unit 71 displays: an operation button for use in selecting the operation target browser from the first group; and an operation button for use in selecting the operation target browser from the second group. In accordance with a user's instructions, the selection unit 71 selects at least one target group from among at least one group, and selects at least one operation target browser from among multiple web browsers included in the at least one target group.

Subsequently, once an event occurs on its own browser, the event processing unit 72 creates a message which includes: group ID information for use in identifying the target group selected by the selection unit 71; and browser ID information for use in identifying the operation target browser, selected by the selection unit 71, in the target group. The event sending unit 74 includes, in the message, the event having occurred on its own browser together with the group ID information and the browser ID information, and then sends the message to the server apparatus 20.

Thereafter, upon receipt of the message including the event, the event transferring unit 84 checks the group ID information included in the message. Then, the event transferring unit 84 transfers the received message including the event, to each of the multiple web browsers subscribing to the group specified by the group ID information.

In this manner, in response to occurrence of an event on a display screen on a given web browser, the computer system 10 according to the first modified example is capable of updating display screens of other web browsers for each group.

Note that, the server apparatus 20 may add a new group including multiple web browsers provided that the relation among the multiple web browsers satisfies a predetermined condition. For example, provided that the number of events transferred between a certain web browser and other web browsers exceeds a predetermined threshold, the server apparatus 20 adds a new group including the certain web browser and the other web browsers.

When adding or deleting any group, the server apparatus 20 notifies each of the multiple web browsers belonging to the added or deleted group of the addition or deletion. In addition, when adding or deleting a web browser belonging to a certain group, the server apparatus 20 notifies each of the multiple web browsers subscribing to the certain group of the addition or deletion.

In accordance with the notification from the server apparatus 20, the selection unit 71 included in the client-program executing unit 70 corresponding to each of the multiple web browsers adds or deletes the group to which its own browser belongs. Furthermore, the selection unit 71 adds or deletes the web browser to or from the group to which its own browser belongs.

For example, provided that the relationship between its own browser and a certain web browser in a group to which its own browser belongs satisfies a predetermined condition, the selection unit 71 adds a new group including its own browser and the certain web browser. For example, provided that the number of events transferred between its own browser and the certain web browser exceeds a predetermined threshold, the selection unit 71 adds a new group.

In this manner, the computer system 10 can prevent events, which are communicated between multiple web browsers in the newly added group, from being transferred to any web browser which does not subscribe to the new group. Thus, the computer system 10 can prevent increase in traffic.

Figure 17:
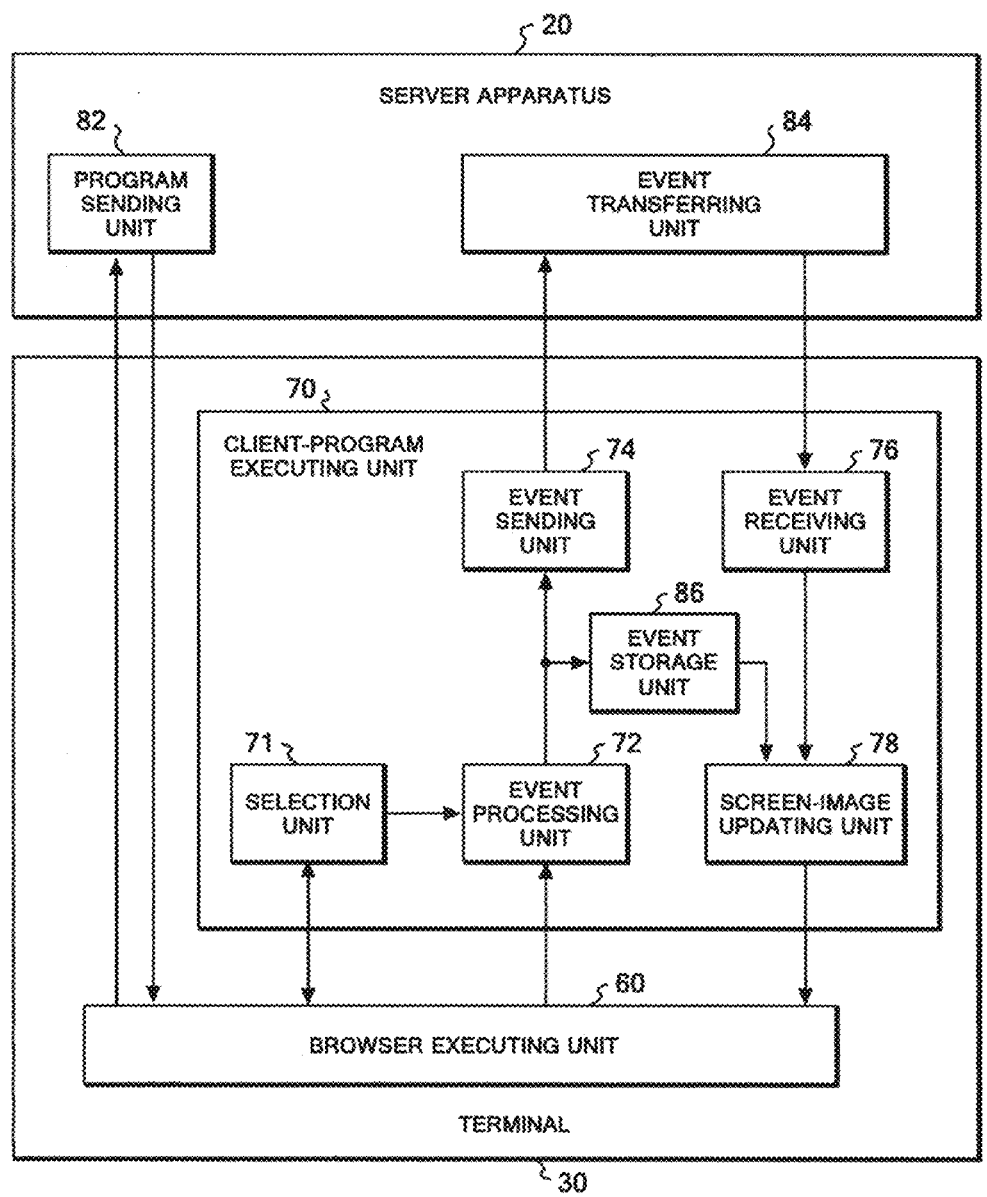
FIG. 17 shows a functional configuration of a server apparatus and a terminal according to a second modified example of embodiments of the present invention.

FIG. 17 shows a functional configuration of a server apparatus 20 and a terminal 30 according to a second modified example of the embodiment. The server apparatus 20 and the terminal 30 according to the modified example employ the configuration and the functions almost the same as those of the server apparatus 20 and the terminal 30 according to the embodiment as shown in FIG. 3. Therefore, the same reference sign is given to a component which has the configuration and the functions almost the same as those of the component shown in FIG. 3, and the descriptions are given only to different components.

The client-program executing unit 70 according to the modified example further includes an event storage unit 86. The event storage unit 86 is provided for each of multiple web browsers and stores therein sent events in the sending order. For example, the event storage unit 86 stores therein, in the sending order, events sent to the corresponding web browsers (i.e., an event of inputting URL and an event of displaying a web page of the inputted URL).

In response to an instruction to synchronize the screen of its own browser with a display screen of any web browser of multiple web browsers, the screen-image updating unit 78 according to the modified example causes the event sent to a specified web browser to be executed on its own browser in the sending order. For example, the screen-image updating unit 78 carries out, on the display screen of its own browser, events sent to the specified web browser, i.e., an event of inputting URL and an event of displaying a web page of the inputted URL. In this manner, the server apparatus 20 and the terminal 30 according to the modified example are capable of synchronizing the display screen of its own browser with the display screens displayed on the other web browsers.

Figure 18:
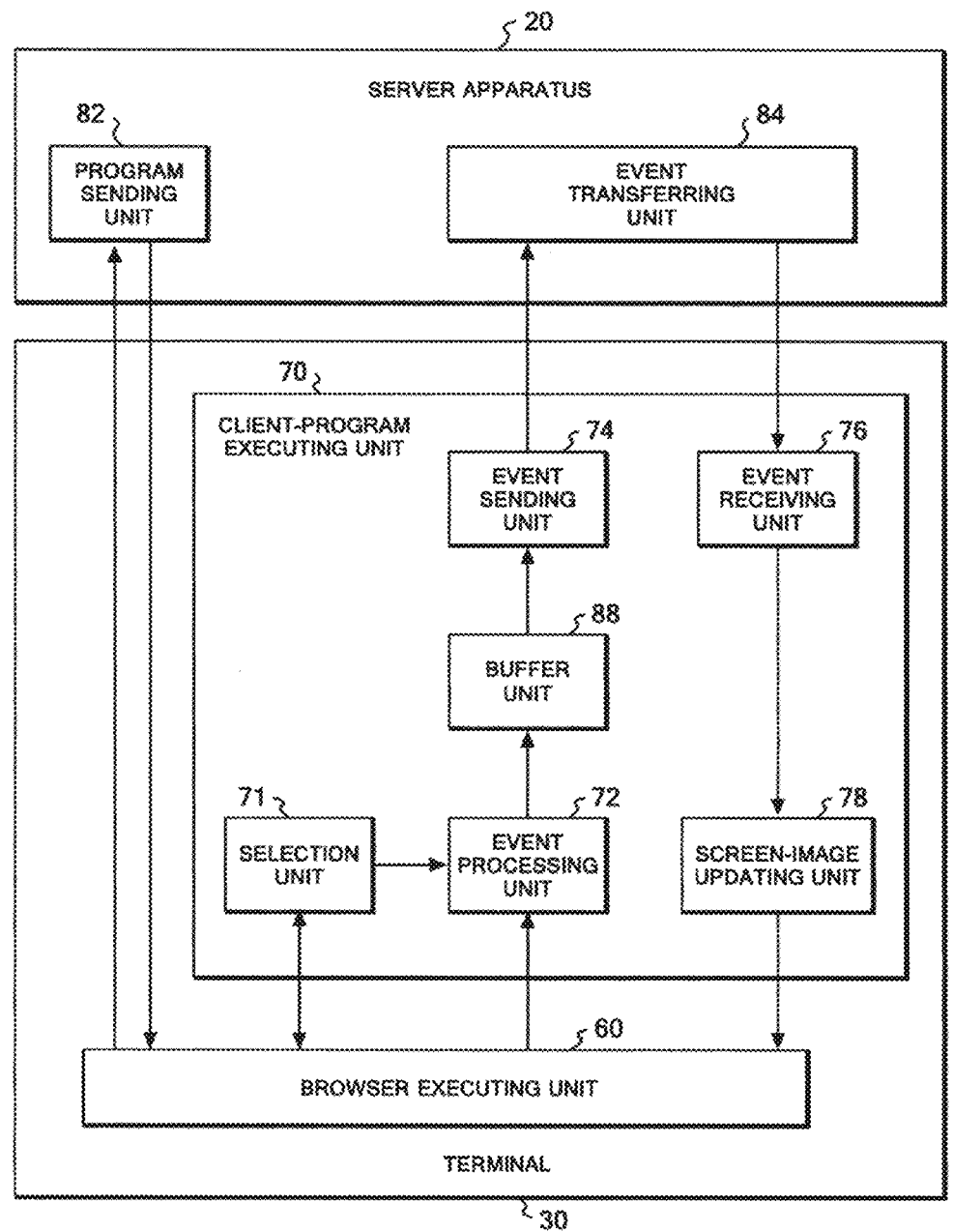
FIG. 18 shows a functional configuration of a server apparatus and a terminal according to a third modified example of embodiments of the present invention.

FIG. 18 shows a functional configuration of a server apparatus 20 and a terminal 30 according to a third modified example of the embodiment. The server apparatus 20 and the terminal 30 according to the modified example employ the configuration and the functions almost the same as those of the server apparatus 20 and the terminal 30 according to the embodiment as shown in FIG. 3. Therefore, the same reference sign is given to a component which has the configuration and the functions almost the same as those of the component shown in FIG. 3, and the descriptions are given only to different components.

The client-program executing unit 70 according to the modified example further includes a buffer unit 88. The buffer unit 88 accumulates therein one or more events having occurred on its own browser. For example, the buffer unit 88 accumulates therein messages created by the event processing unit 72.

In response to receipt of a user's instruction to update the display screens of the other web browsers, the event sending unit 74 sends the server apparatus 20 the one or more events accumulated in the buffer unit 88. According to the terminal 30 of the modified example, the display screens of the other web browsers can be updated at the timing desired by the user.

In the modified example, the screen-image updating unit 78 obtains an event having occurred on its own browser directly from the event processing unit 72, to thus update the display screen of its own browser and obtain a screen according to the obtained event. As such, the server apparatus 20 and the terminal 30 according to the modified example can make the display screen of its own browser updated without involvement of the server apparatus 20 as long as the event occurs on its own browser. Accordingly, the server apparatus 20 and the terminal 30 according to the modified example achieve reduction in response time from the event occurrence to the update of the display screen, and thereby achieve improvement in their operability.

Figure 19:
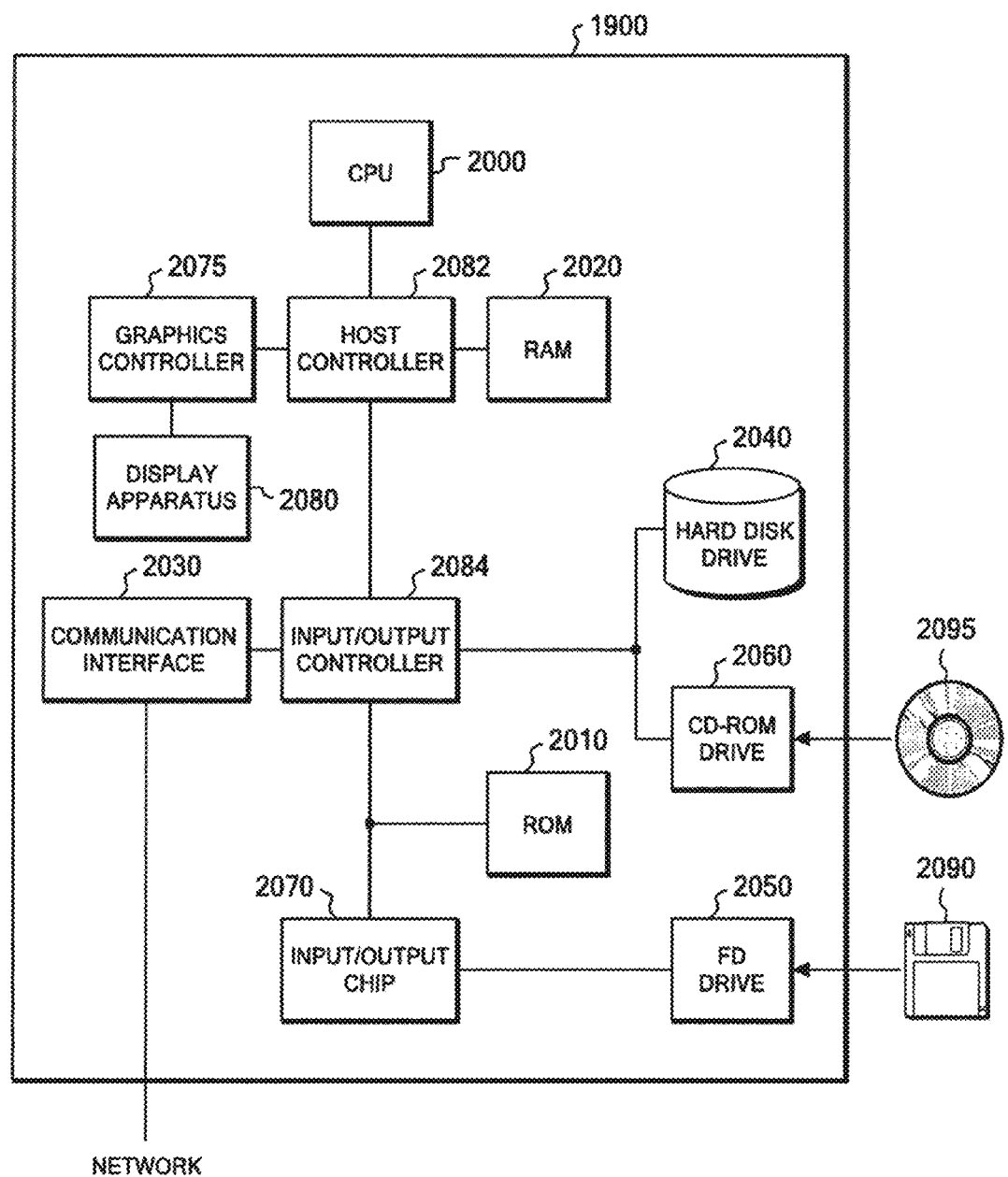
FIG. 19 shows an example of a hardware configuration of a computer, in accordance with embodiments of the present invention.

FIG. 19 shows an example of a hardware configuration of a computer 1900 according to the embodiment. The computer 1900 according to the embodiment includes: a CPU peripheral section having a CPU 2000, a RAM 2020, a graphics controller 2075, and a display apparatus 2080 which are connected to each other via a host controller 2082; an input/output section having a communication interface 2030, a hard disk drive 2040, and a CD-ROM drive 2060 which are connected to the host controller 2082 through an input/output controller 2084; and a legacy input/output section having a ROM 2010, a flexible disk drive 2050, and an input/output chip 2070 which are connected to the input/output controller 2084.

The host controller 2082 connects the RAM 2020 to the CPU 2000 and the graphics controller 2075 which access the RAM 2020 at a high transfer rate. The CPU 2000 operates on the basis of programs stored in the ROM 2010 and the RAM 2020, thereby controlling each unit. The graphics controller 2075 obtains image data generated by the CPU 2000 or the like on a frame buffer provided in the RAM 2020, and causes the image data to be displayed on the display apparatus 2080. Alternatively, the graphics controller 2075 may contain therein a frame buffer to store image data generated by the CPU 2000 or the like.

The input/output controller 2084 connects the host controller 2082 to the communication interface 2030, the hard disk drive 2040, and the CD-ROM drive 2060 which are relatively high-speed input/output devices. The communication interface 2030 communicates with other devices through a network. The hard disk drive 2040 stores therein a program and data used by the CPU 2000 within the computer 1900. The CD-ROM drive 2060 reads a program or data from a CD-ROM 2095, and provides the hard disk drive 2040 with the program or the data through the RAM 2020.

Additionally, the ROM 2010, the flexible disk drive 2050, and the input/output chip 2070 which are relatively low-speed input/output devices are connected to the input/output controller 2084. The ROM 2010 stores therein at least any one of a boot program executed by the computer 1900 at the time of activation, a program depending on the hardware of the computer 1900, and the like. The flexible disk drive 2050 reads a program or data from a flexible disk 2090, and provides the hard disk drive 2040 with the program or the data through the RAM 2020. The input/output chip 2070 connects the flexible disk drive 2050 to the input/output controller 2084, and also connects various input/output devices to the input/output controller 2084 through a parallel port, a serial port, a keyboard port, a mouse port, and the like, for example.

A program to be provided to the hard disk drive 2040 through the RAM 2020 is provided by a user by being stored in a recording medium such as the flexible disk 2090, the CD-ROM 2095, or an IC card. The program is read from the recording medium, installed into the hard disk drive 2040 within the computer 1900 through the RAM 2020, and executed by the CPU 2000.

The client program which is downloaded into the computer 1900 to be executed and which causes the computer 1900 to function as the client-program executing unit 70 includes a selection module, an event processing module, an event sending module, en event receiving module, and a screen-image changing module. By acting on the CPU 2000 and the like, this program causes or these respective modules cause the computer 1900 to function as the selection unit 71, the event processing unit 72, the event sending unit 74, the event receiving unit 76, and the screen-image updating unit 78.

By being read into the computer 1900, information processing written in this program functions as the selection unit 71, the event processing unit 72, the event sending unit 74, the event receiving unit 76, and the screen-image updating unit 78 which are specific means implemented through cooperation between software and the above-described various hardware resources. By using these specific means to perform arithmetic operations or processing on information corresponding to the purpose of use of the computer 1900 according to the embodiment, the terminal 30 specific to the purpose of use can be constructed.

A program that is installed into the computer 1900 and causes the computer 1900 to function as the server apparatus 20 includes a program sending module and an event transferring module. By acting on the CPU 2000 and the like, this program causes or these respective modules cause the computer 1900 to function as the program sending unit 82 and the event transferring unit 84.

By being read into the computer 1900, information processing written in this program functions as the program sending unit 82 and the event transferring unit 84 which are specific means implemented through cooperation between software and the above-described various hardware resources. By using these specific means to perform arithmetic operations or processing on information corresponding to the purpose of use of the computer 1900 according to the embodiment, the server apparatus 20 specific to the purpose of use can be constructed.

In one example, in a case where communication is performed between the computer 1900 and an external apparatus or the like, the CPU 2000 executes a communication program loaded onto the RAM 2020, and instructs the communication interface 2030 to perform communication processing on the basis of a processing content written in the communication program. Under control of the CPU 2000, the communication interface 2030 reads data to be transmitted (hereinafter, transmission data) that is stored in a transmission buffer region or the like provided in any one of the storage devices such as the RAM 2020, the hard disk drive 2040, the flexible disk 2090, and the CD-ROM 2095. The communication interface 2030 then transmits the transmission data to a network. Otherwise, the communication interface 2030 writes reception data received from the network into a reception buffer or the like provided on the storage device. The communication interface 2030 may transfer transmission data and reception data between itself and the storage device by using a direct memory access (DMA) scheme in the above described manner. Instead, the CPU 2000 may transfer transmission data and reception data by reading the data from the storage device or the communication interface 2030, which is an origin of the transfer, and then writing the data into the communication interface 2030 or the storage device, which is a destination of the transfer.

Additionally, the CPU 2000 loads all or any necessary part of files, databases and the like, which are stored in external storage devices, into the RAM 2020 through DMA transfer or the like, and then performs various kinds of processing on data on the RAM 2020. Here, the external storage devices include the hard disk drive 2040, the CD-ROM drive 2060 (CD-ROM 2095), and the flexible disk drive 2050 (flexible disk 2090). Then, the CPU 2000 writes the data, on which the processing has been performed, back into the external storage devices through DMA transfer or the like. In the processing as described herein, the RAM 2020, the external storage devices and the like are collectively referred to as memories, storage units, storage devices or the like in the embodiment because the RAM 2020 can be considered as a component that temporarily retains contents of the external storage devices. Various kinds of information such as various programs, data, tables, databases and the like in the embodiment are stored in the storage devices as described herein, and are subjected to information processing. Note that the CPU 2000 is also capable of retaining a part of the RAM 2020 in a cache memory, and writing and reading information into and from the cache memory. The cache memory shares the function of the RAM 2020 also in this form. Thus, in the embodiment, the cache memory is also assumed to be included in the RAM 2020, the memories, and/or the storage devices unless otherwise described distinctly.

Additionally, the CPU 2000 performs various kinds of processing on data read from the RAM 2020 and then writes the data back to the RAM 2020, the various kinds of processing being specified by command strings in programs and including various kinds of arithmetic operations, processing of information, conditional judgments, retrieving and replacement of information, and the like which have been described in the embodiment. For example, when performing a conditional judgment, the CPU 2000 checks whether or not each of various variables shown in the embodiment satisfies a condition, for example, that the variable is larger, smaller, not more than, not less than, or equal to another variable or a constant. If the condition holds true (or does not hold true), the CPU 2000 causes the processing to branch into a different command string or invokes a subroutine.

Additionally, the CPU 2000 is capable of retrieving information stored in a file, a database or the like in a storage device. For example, consider a case where multiple entries are stored in the storage device, the multiple entries each having an attribute value of a second attribute associated with an attribute value of a first attribute. In this case, the CPU 2000 retrieves, from among the entries stored in the storage device, a certain entry having an attribute value of the first attribute that agrees with a specified condition. The CPU 2000 then reads an attribute value of the second attribute, stored in the certain entry. Thus, the CPU 2000 is capable of acquiring an attribute value of the second attribute, associated with the first attribute that satisfies a predetermined condition.

Each of the above described programs or modules may be stored in an external recording medium. Besides the flexible disk 2090 and the CD-ROM 2095, any one of an optical recording medium such as a DVD and a CD, a magneto-optical recording medium such as an MO, a tape medium, and a semiconductor memory such as an IC card can be used as the recording medium. In addition, the programs may be provided to the computer 1900 through the network by using, as a recording medium, a storage device such as a hard disk or a RAM provided in a server system connected to a dedicated communication network or the Internet.

In accordance with FIG. 19, each terminal of the present invention comprises a processor, a memory coupled to the processor, and a computer readable storage device coupled to the processor and containing program code configured to be executed by the processor via the memory to implement the methods of the present invention.

Figure 20:
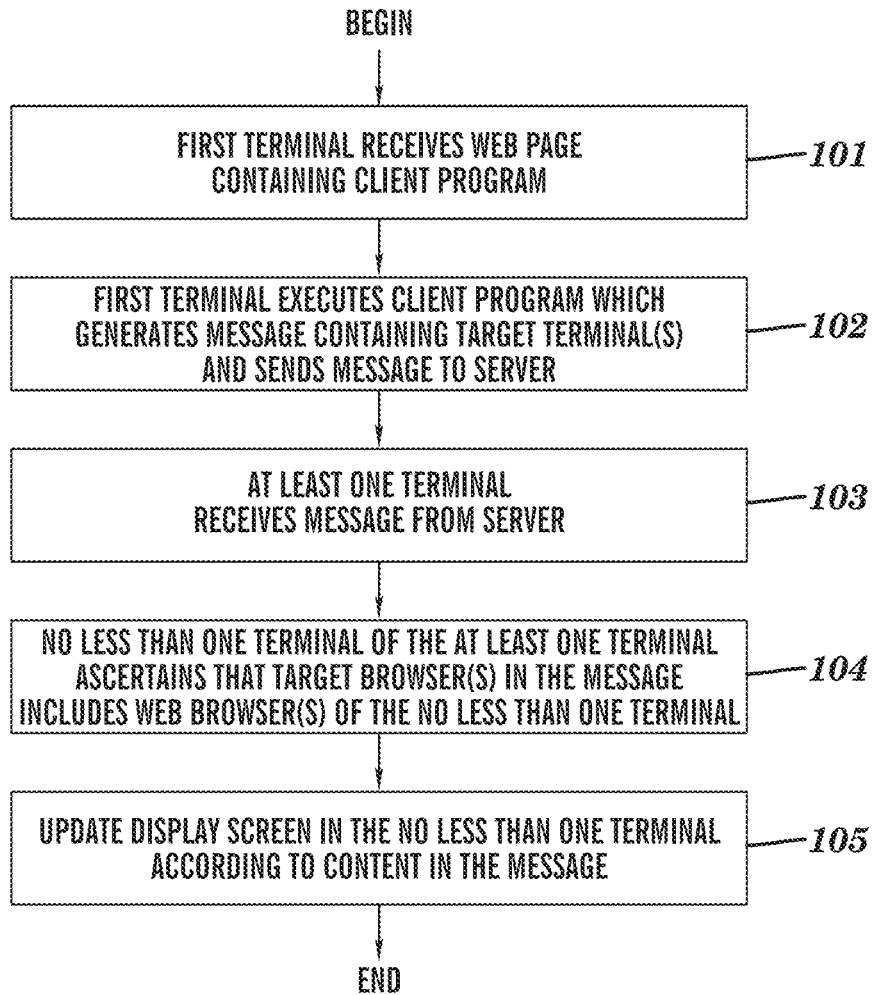
FIG. 20 is a flow chart describing a method for updating display screens, in accordance with embodiments of the present invention.

FIG. 20 is a flow chart describing a method for updating display screens, in accordance with embodiments of the present invention. The flow chart of FIG. 20 includes step 101-105.

The method described in FIG. 20 is performed in a system comprising a first terminal and at least one terminal that does not include the first terminal.

In step 101, a first web browser in the first terminal receives from a server a web page that includes a client program. The server is coupled to the first terminal and to each terminal of the at least one terminal. The at least one terminal does not include the first terminal.

In step 102, a first processor in the first terminal executes the client program via execution of the client program by a first client-program executing unit in the first terminal. The first client-program executing unit is external to and coupled to a first web browser in the first terminal. Said executing the client program, which is triggered by the first web browser: generates a selection of at least one target browser by a user at the first terminal; detects an event resulting from the user's operation on a first display screen at the first terminal; generates a message comprising the selected at least one target browser, a description of the event, and a parameter pertaining to the event; and sends the message to the server.

In step 103, each terminal of the at least one terminal receives the message from the server. Each terminal of the at least one terminal comprises at least one web browser to which at least one respective client-program executing unit and at least one respective display screen is coupled. Said receiving the message from the server is performed by a processor in each terminal of at the least one terminal via execution of the respective client-program executing unit.

In step 104, in response to each processor in each terminal receiving the message from the server, each processor in no less than one terminal of the at least one terminal ascertains, via execution of the respective client-program executing unit, that the at least one target browser in the message comprises the web browser to which the respective client-program executing unit is coupled in each terminal of the no less than one terminal.

In step 105, in response to said ascertaining (that the at least one target browser in the message comprises the web browser to which the respective client-program executing unit is coupled in each terminal of the no less than one terminal), each processor in the no less than one terminal triggers, via execution of the respective client-program executing unit, an updating of the respective display screen in accordance with the description of the event and the parameter pertaining to the event in the message.

Figure 21:
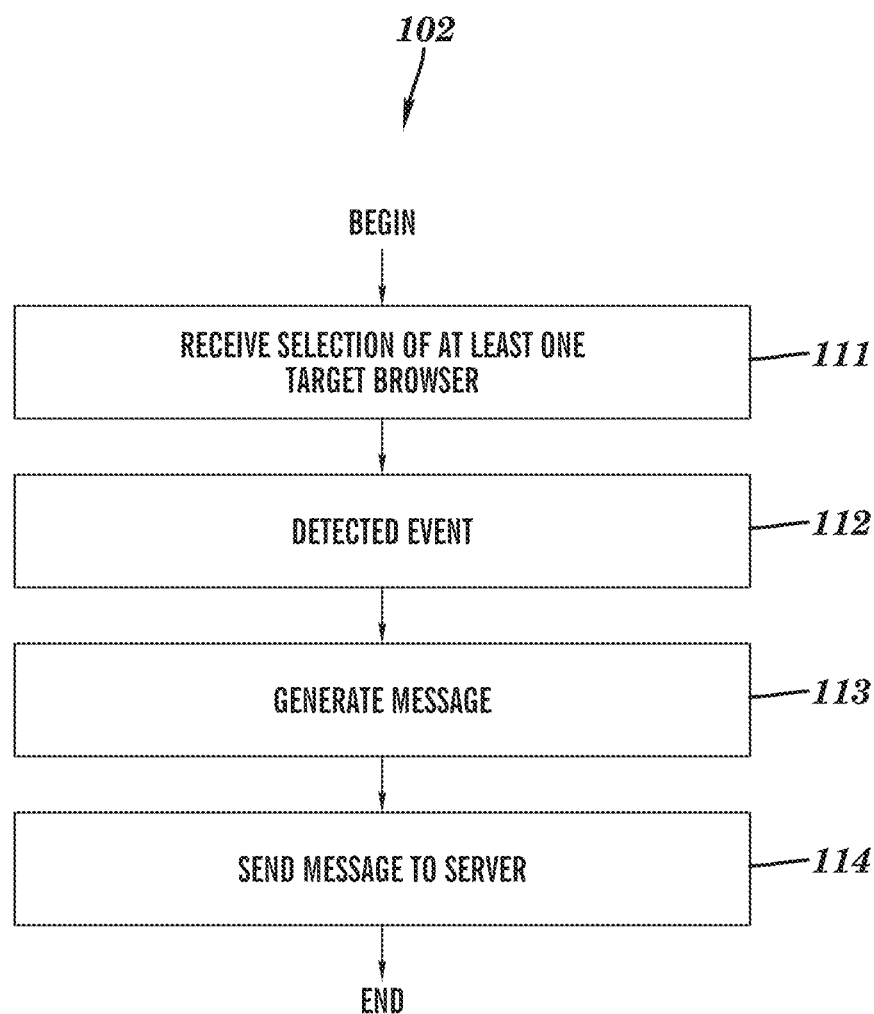
FIG. 21 is a flow chart detailing a step in FIG. 20, for generating and sending a message, in accordance with embodiments of the present invention.

FIG. 21 is a flow chart detailing step 102 of FIG. 20, for generating and sending a message, in accordance with embodiments of the present invention. The flow chart of FIG. 20 includes step 111-115.

In step 111, the first processor receives a selection of at least one target browser by a user at the first terminal.

In step 112, the first processor detects an event resulting from the user's operation on a first display screen at the first terminal.

In step 113, in response to said detecting the event, the first processor generates a message comprising the selected at least one target browser, a description of the event, and a parameter pertaining to the event.

In step 114, the first processor in the first terminal sends the message to the server.

The present invention includes additional embodiments with respect to the method described in FIGS. 20 and 21.

In one embodiment, the at least one terminal comprises a plurality of terminals, wherein the no less than one terminal consists of the plurality of terminals.

In one embodiment, the at least one target browser comprises a plurality of target browsers, said target browsers being different target browsers. In one related embodiment, the plurality of target browsers comprises the first web browser. In one related embodiment, the plurality of target browsers does not comprise the first web browser.

In one embodiment, each group of browsers of at least one group of browsers comprises the first web browser, wherein each target browser is comprised by no less than one group of browsers of the at least one group of browsers, wherein each group of browsers comprises a group identifier that identifies said each group of browsers, and wherein the generated message further comprises the group identifier of each group of browsers.

In one embodiment pertaining to the at least one group of browsers, the at least one group of browsers comprises a plurality of groups of browsers. In one related embodiment, each target browser is comprised by no more than one group of browsers of the plurality of groups of browsers. In one related embodiment, a first target browser of the plurality of target browsers is comprised by at least two groups of browsers of the plurality of groups of browsers. In one related embodiment, a second target browser of the plurality of target browsers is comprised by no more than one group of browsers of the plurality of groups of browsers.

While the present invention has been described hereinabove by means of the embodiment, the technical scope of the present invention is not limited to the extent described in the abovementioned embodiment. It will be apparent to those skilled in the art that various modifications and improvements can be added to the abovementioned embodiment. From the description of the scope of claims, it is apparent that the technical scope of the present invention should include embodiments involving such modifications or improvements.

It should be noted that the orders of executing processes such as operations, procedures, steps, and stages in the apparatuses, systems, programs and methods shown in the scope of claims, the description, and the drawings are not clearly specified by use of particular expressions such as "before" and "prior to", and that those processes can be executed in any order unless an output from a preceding one of the processes is used in a subsequent process. Even if a description has been given of any operational flow in the scope of claims, the description, and the drawings by use of expressions such as "firstly," and "subsequently," for the sake of convenience, it does not mean that the operational flow should mandatorily be executed in the order indicated by these expressions.

What is claimed is:

1. A method for utilizing target browsers, said method performed in a system comprising a first terminal and a first processor in the first terminal, said method comprising:

said first processor executing a client program in the first terminal, said system further comprising at least one terminal, said at least one terminal not including the first terminal, said executing the client program triggered by a first web browser in the first terminal and comprising:

said first processor receiving a selection of at least one target browser by a user at a user interface at the first terminal, wherein the user interface displays a plurality of target browsers for each group of target browsers of a plurality of groups of target browsers from which the user has selected the at least one target browser, said first processor detecting an event resulting from the user's operation on a first display screen at the first terminal, in response to said detecting the event, said first processor generating a message that includes the selected at least one target browser, a description of the event, and a parameter pertaining to the event, said first processor in the first terminal sending the message to a server, said server coupled to the first terminal and to each terminal of the at least one terminal;

each terminal of the at least one terminal receiving the message from the server, each terminal of the at least one terminal comprising at least one web browser to which at least one respective display screen is coupled, said receiving the message from the server being performed by a processor in each terminal of at the least one terminal;

in response to each processor in each terminal receiving the message from the server, each processor in no less than one terminal of the at least one terminal ascertaining that the at least one target browser in the message comprises the web browser; and in response to said ascertaining, each processor in the no less than one terminal triggering an updating of the respective display screen in accordance with the description of the event and the parameter pertaining to the event in the message.

2. The method of claim 1, wherein a first target browser is in at least two groups of target browsers of the plurality of groups of target browsers.

3. The method of claim 2, wherein a second target browser is in only one group of target browsers of the plurality of groups of target browsers.

4. The method of claim 1, wherein the at least one target browser comprises at least two target browsers.

5. The method of claim 4, wherein the at least two target browsers comprises the first web browser.

6. The method of claim 1, wherein a web page received by the first web browser from the server includes the client program.

7. A system comprising a first terminal, a first processor in the first terminal, a memory coupled to the first processor, and a computer readable storage device coupled to the first processor and containing program code configured to be executed by the first processor via the memory to implement a method for utilizing target browsers, said method comprising:

said first processor executing a client program in the first terminal, said system further comprising at least one terminal, said at least one terminal not including the first terminal, said executing the client program triggered by a first web browser in the first terminal and comprising:

said first processor receiving a selection of at least one target browser by a user at a user interface at the first terminal, wherein the user interface displays a plurality of target browsers for each group of target browsers of a plurality of groups of target browsers from which the user has selected the at least one target browser, said first processor detecting an event resulting from the user's operation on a first display screen at the first terminal, in response to said detecting the event, said first processor generating a message that includes the selected at least one target browser, a description of the event, and a parameter pertaining to the event, said first processor in the first terminal sending the message to a server, said server coupled to the first terminal and to each terminal of the at least one terminal, each terminal of the at least one terminal receiving the message from the server, each terminal of the at least one terminal comprising at least one web browser to which at least one respective display screen is coupled, said receiving the message from the server being performed by a processor in each terminal of at the least one terminal;

in response to each processor in each terminal receiving the message from the server, each processor in no less than one terminal of the at least one terminal ascertaining that the at least one target browser in the message comprises the web browser; and in response to said ascertaining, each processor in the no less than one terminal triggering an updating of the respective display screen in accordance with the description of the event and the parameter pertaining to the event in the message.

8. The system of claim 7, wherein a first target browser is in at least two groups of target browsers of the plurality of groups of target browsers.

9. The system of claim 8, wherein a second target browser is in only one group of target browsers of the plurality of groups of target browsers.

10. The system of claim 7, wherein the at least one target browser comprises at least two target browsers.

11. The system of claim 10, wherein the at least two target browsers comprises the first web browser.

12. The system of claim 7, wherein a web page received by the first web browser from the server includes the client program.

13. A computer program product, comprising a computer readable hardware storage device having computer readable program code stored therein, said program code executable by a first processor in a first terminal configured to implement a method for utilizing target browsers, said method comprising:

said first processor executing a client program in the first terminal, said system further comprising at least one terminal, said at least one terminal not including the first terminal, said executing the client program triggered by a first web browser in the first terminal and comprising:

said first processor receiving a selection of at least one target browser by a user at a user interface at the first terminal, wherein the user interface displays a plurality of target browsers for each group of target browsers of a plurality of groups of target browsers from which the user has selected the at least one target browser, said first processor detecting an event resulting from the user's operation on a first display screen at the first terminal, in response to said detecting the event, said first processor generating a message that includes the selected at least one target browser, a description of the event, and a parameter pertaining to the event, said first processor in the first terminal sending the message to a server, said server coupled to the first terminal and to each terminal of the at least one terminal, each terminal of the at least one terminal receiving the message from the server, each terminal of the at least one terminal comprising at least one web browser to which at least one respective display screen is coupled, said receiving the message from the server being performed by a processor in each terminal of at the least one terminal, in response to each processor in each terminal receiving the message from the server, each processor in no less than one terminal of the at least one terminal ascertaining that the at least one target browser in the message comprises the web browser; and in response to said ascertaining, each processor in the no less than one terminal triggering an updating of the respective display screen in accordance with the description of the event and the parameter pertaining to the event in the message.

14. The computer program product of claim 13, wherein a first target browser is in at least two groups of target browsers of the plurality of groups of target browsers.

15. The computer program product of claim 14, wherein a second target browser is in only one group of target browsers of the plurality of groups of target browsers.

16. The computer program product of claim 13, wherein the at least one target browser comprises at least two target browsers.

17. The computer program product of claim 16, wherein the at least two target browsers comprises the first web browser.

18. The computer program product of claim 13, wherein a web page received by the first web browser from the server includes the client program.

* * * * *